United States Patent
Atchley et al.

(10) Patent No.: US 10,625,899 B2
(45) Date of Patent: Apr. 21, 2020

(54) RETAIL DELIVERY PACKAGES AND METHODS OF PRODUCT DELIVERY

(71) Applicant: Walmart Apollo, LLC, Bentonville, AR (US)

(72) Inventors: Michael D. Atchley, Springdale, AR (US); Robert C. Taylor, Rogers, AR (US); John P. Thompson, Bentonville, AR (US); Eric A. Letson, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 15/941,565

(22) Filed: Mar. 30, 2018

(65) Prior Publication Data

US 2018/0282014 A1 Oct. 4, 2018

Related U.S. Application Data

(60) Provisional application No. 62/479,655, filed on Mar. 31, 2017.

(51) Int. Cl.
*B65D 5/42* (2006.01)
*B65D 5/468* (2006.01)
(Continued)

(52) U.S. Cl.
CPC ......... B65D 5/4233 (2013.01); B65D 5/2047 (2013.01); B65D 5/4608 (2013.01);
(Continued)

(58) Field of Classification Search
CPC .. B65D 5/4233; B65D 5/2047; B65D 5/4608; B65D 5/46128; B65D 5/6635;
(Continued)

(56) References Cited

U.S. PATENT DOCUMENTS 1,876,288 A 9/1932 Good
2,336,655 A * 12/1943 Tobey ............... B65D 5/46128
229/117.14

(Continued)

FOREIGN PATENT DOCUMENTS

| CN | 202072128 | 12/2011 |
| EP | 0957037 | 11/1999 |
| WO | 2016079747 | 5/2016 |

OTHER PUBLICATIONS

Laszlo Roth and George L. Wybenga, The Packaging Designer's Book of Pasterns, Copyright (c) 1991 by Van Nostrand Reinhold, Library of Congress Catalog No. 90-27825 ISBN 0-442-00524-5 (Year: 1991).*

(Continued)

*Primary Examiner* — Ernesto A Grano
(74) *Attorney, Agent, or Firm* — Fitch, Even, Tabin & Flannery LLP

(57) ABSTRACT

In some embodiments, systems, apparatuses and methods are provided herein that enable delivery of retail products. Some embodiments provide retail product delivery transport packages, comprising: a base; a first set of tapered walls comprising at least two side walls that are separated by a length of the base and extend from the base at an angle such that a distance between the first tapered wall and the second tapered wall at the opening is greater than a distance between the first tapered wall and the second tapered wall at the base, and wherein the first and second tapered walls are configured to frictionally engage first and second tapered package support walls, respectively, of a delivery package carrier system; and a second set of at least one wall comprising at least a first vertical wall.

15 Claims, 11 Drawing Sheets

(51) Int. Cl.
    *B65D 81/38*     (2006.01)
    *G06Q 50/28*     (2012.01)
    *B65D 5/46*     (2006.01)
    *B65D 5/20*     (2006.01)
    *B65D 5/66*     (2006.01)
    *G06K 19/07*     (2006.01)
    *B64C 39/02*     (2006.01)
    *B64D 1/02*     (2006.01)

(52) U.S. Cl.
    CPC ....... *B65D 5/46128* (2013.01); *B65D 5/6635* (2013.01); *B65D 81/3834* (2013.01); *G06Q 50/28* (2013.01); *B64C 39/024* (2013.01); *B64C 2201/128* (2013.01); *B64D 1/02* (2013.01); *B65D 2203/10* (2013.01); *G06K 19/0723* (2013.01)

(58) Field of Classification Search
    CPC ............ B65D 2203/10; B65D 81/3834; G06Q 50/28; G06K 19/0723; B64C 39/024; B64C 201/128; B64D 1/02
    See application file for complete search history.

(56) References Cited

U.S. PATENT DOCUMENTS

| | | | |
|---|---|---|---|
| 2,371,640 A | 3/1945 | Manson | |
| 2,731,190 A * | 1/1956 | Farrell | B65D 5/2047 229/125.17 |
| 3,559,869 A * | 2/1971 | Reynolds | B65D 5/2047 229/114 |
| 4,238,069 A * | 12/1980 | Morris, Jr. | B65D 5/2047 229/114 |
| 4,260,098 A * | 4/1981 | Manizza | B65D 5/2047 229/114 |
| 4,381,872 A | 5/1983 | Hahn | |
| 5,009,326 A | 4/1991 | Reaves | |
| 5,506,726 A * | 4/1996 | Tahira | G02B 23/18 359/407 |
| 5,535,883 A | 7/1996 | Henderson | |
| 5,853,121 A * | 12/1998 | Francisco | B65D 5/2047 229/188 |
| 6,050,483 A * | 4/2000 | Haraldsson | B65D 5/2047 229/114 |
| 6,318,473 B1 | 11/2001 | Barley | |
| D572,169 S * | 7/2008 | De Roeck | D11/155 |
| 7,870,995 B1 * | 1/2011 | Kaltman | B65D 5/2047 206/485 |
| D631,743 S * | 2/2011 | Hubbard, Jr. | D9/431 |
| 7,959,061 B2 * | 6/2011 | Kaltman | B65D 5/2047 229/114 |
| D650,665 S * | 12/2011 | Kaltman | D9/433 |
| 8,162,263 B2 | 4/2012 | Wong | |
| 8,887,983 B2 * | 11/2014 | Kaltman | B65D 5/2047 229/114 |
| 9,108,793 B2 * | 8/2015 | Northrup | B65D 5/64 |
| 9,302,770 B2 | 4/2016 | Burgess | |
| 9,346,547 B2 | 5/2016 | Patrick | |
| 9,348,333 B1 | 5/2016 | Buchmueller | |
| 9,387,952 B2 * | 7/2016 | Kaltman | B65D 5/2047 |
| 9,449,295 B2 * | 9/2016 | Russell | G06Q 10/087 |
| 9,550,577 B1 | 1/2017 | Beckman | |
| 9,573,684 B2 | 2/2017 | Kimchi | |
| 9,676,511 B2 * | 6/2017 | Kaltman | B65D 5/2047 |
| 2003/0084679 A1 | 5/2003 | Charlton | |
| 2003/0197053 A1 * | 10/2003 | Haraldsson | B65D 5/246 229/186 |
| 2004/0031842 A1 * | 2/2004 | Westerman | B65D 5/2057 229/117.06 |
| 2004/0182916 A1 * | 9/2004 | Roseth | B65D 5/2047 229/155 |
| 2007/0017964 A1 * | 1/2007 | Kamolsuwan | B65D 5/2047 229/155 |
| 2011/0072719 A1 * | 3/2011 | Kaltman | B65D 5/2047 47/72 |
| 2011/0089227 A1 * | 4/2011 | Kaltman | B65D 5/2047 229/114 |
| 2012/0080443 A1 | 4/2012 | Stephens | |
| 2014/0339294 A1 * | 11/2014 | Northrup | B65D 5/64 229/124 |
| 2015/0034710 A1 * | 2/2015 | Kaltman | B65D 5/2047 229/175 |
| 2015/0120094 A1 | 4/2015 | Kimchi | |
| 2015/0158587 A1 | 6/2015 | Patrick | |
| 2015/0277440 A1 | 10/2015 | Kimchi | |
| 2016/0196755 A1 | 7/2016 | Navot | |
| 2016/0257401 A1 | 9/2016 | Buchmueller | |
| 2017/0081029 A1 | 3/2017 | Jones | |
| 2017/0110017 A1 | 4/2017 | Kimchi | |
| 2018/0281954 A1 | 10/2018 | Atchley | |
| 2019/0047746 A1 * | 2/2019 | Kunishima | B65D 5/208 |

OTHER PUBLICATIONS

AliExpress; "12 pieces of four color single handle boxes / cartons and packaging of cake with personalized tags for wedding PCB007"; https://th.aliexpress.com/item/Free-Shipping-Four-Colors-Handle-Single-Cupcake-Boxes-Box-and-Packaging-Of-Cake-With-Personalized-Tag/32632339525.html?spm=2114.54010308.4.93.uX1Luy; Available at least as early as Dec. 19, 2016; pp. 1-12.

Amazon; "Amazon Prime Air"; https://www.youtube.com/watch?v=98B1u9dpwHU; Dec. 1, 2013; pp. 1-7.

Dreamstime; "White trapezoid box."; https://www.dreamstime.com/royalty-free-stock-photo-white-trapezoid-box-image24174085; Available at least as early as Dec. 19, 2016; pp. 1.

McNabb, H.; "Video of the Day May 29, 2015: DIY Drone Delivery"; https://dronelife.com/2015/05/29/video-of-the-day-52915-diy-drone-delivery/; May 29, 2015; pp. 1-9.

PCT; App. No. PCT/US2018/024738; International Search Report and Written Opinion dated Jun. 28, 2018.

PCT; App. No. PCT/US2018/024741; International Search Report and Written Opinion dated Jun. 7, 2018.

The Dieline; "Trapezoidal Boxes"; http://www.thedieline.com/blog/2010/6/4/trapezoidal-boxes.html; Jun. 4, 2010; pp. 1-5.

* cited by examiner

RETAIL DELIVERY PACKAGES AND METHODS OF PRODUCT DELIVERY

CROSS-REFERENCE TO RELATED APPLICATION

This application claims the benefit of U.S. Application No. 62/479,655, filed Mar. 31, 2017, which is incorporated herein by reference in its entirety.

TECHNICAL FIELD

This invention relates generally to retail product delivery.

BACKGROUND

In a modern retail environment, there is a need to improve the customer service and/or convenience for the customer. One aspect of customer service is a customer's access to products. There are numerous ways to provide products to locations to allow customers access to products. However, there is a need to improve product distribution.

BRIEF DESCRIPTION OF THE DRAWINGS

Disclosed herein are embodiments of systems, apparatuses and methods pertaining to retail product delivery. This description includes drawings, wherein.

Figure 1:
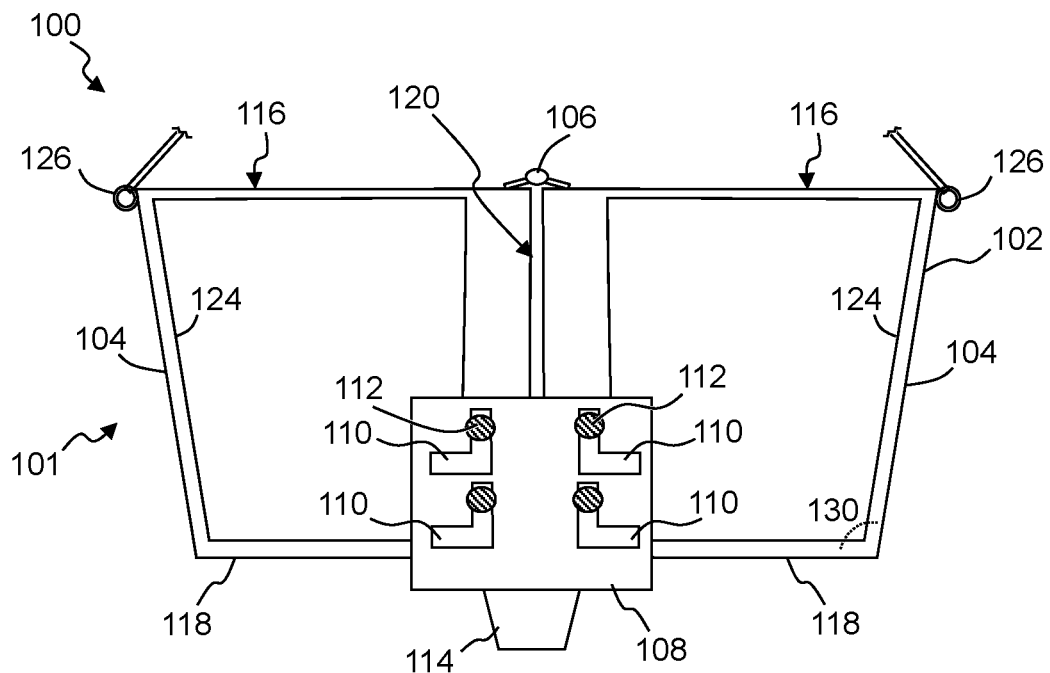
FIG. 1 illustrates a simplified block diagram plane view of an exemplary retail product delivery system in a locked state or position, in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," "some embodiments", "an implementation", "some implementations", "some applications", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification may, but do not necessarily, all refer to the same embodiment.

Generally speaking, pursuant to various embodiments, systems, apparatuses and methods are provided herein that simplify delivery of packages to customers through mechanical activation through contact with a surface. Some embodiments provide package and/or retail product delivery systems that include a package support frame comprising first and second package supports or frames, and at least one pivot coupler that pivotably secures the first package support with the second package support. The pivot coupling enables at least a base of the first package support to pivot away from a base of the second package support and/or the base of the second package support to pivot away from the base of the first package support. Further, the product delivery system includes at least one release plate positioned across a boundary or edge of each of the first and second package supports and across the separation between the first package support and the second package support.

In some embodiments, the release plate includes a set of at least one angled locking grooves, and a set of at least one groove pins each secured with one of the first package support and the second package support and slidably positioned within a respective one of the set of at least one locking grooves. Further, at least one of the release plates further includes at least one release tab that extends beyond the bases of the first and second package supports. By extending below the bases of the first and second package supports, the first release tab can contact a delivery surface during delivery and cause an unlocking of the release plate such that the release plate moves relative to the package supports and with the set of locking grooves sliding along the respective one of the groove pins such that at least the base of the first package support pivots away from the base of the second package support enlarging a package release aperture.

The product delivery system is activated without the need to communicate a trigger or open signal, and without the need to activate an electrical signal. Instead, some embodiments employ a mechanical activation. This mechanical activation greatly simplifies the delivery system, and further allows the system to be utilized with multiple different types of delivery methods (e.g., land and/or ground based unmanned vehicles, human delivery, human operated vehicles, and other such methods). Further, the mechanical activation allows the product delivery system to be implemented without an electrical power source, motors, and the like. Still further, in some utilizations a human (e.g., customers at delivery locations) does not have to interact with the product delivery system to trigger the package release.

Figure 2:
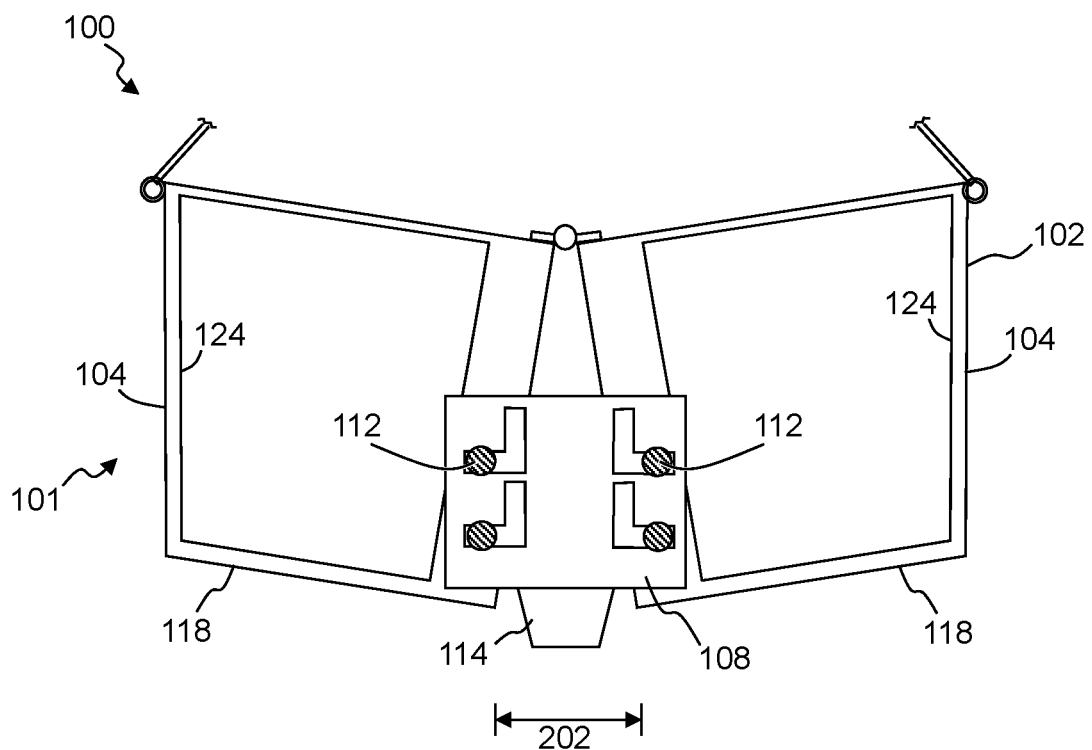
FIG. 2 illustrates a simplified block diagram plane view of the exemplary retail delivery system in an unlocked state, in accordance with some embodiments.
Figure 3:
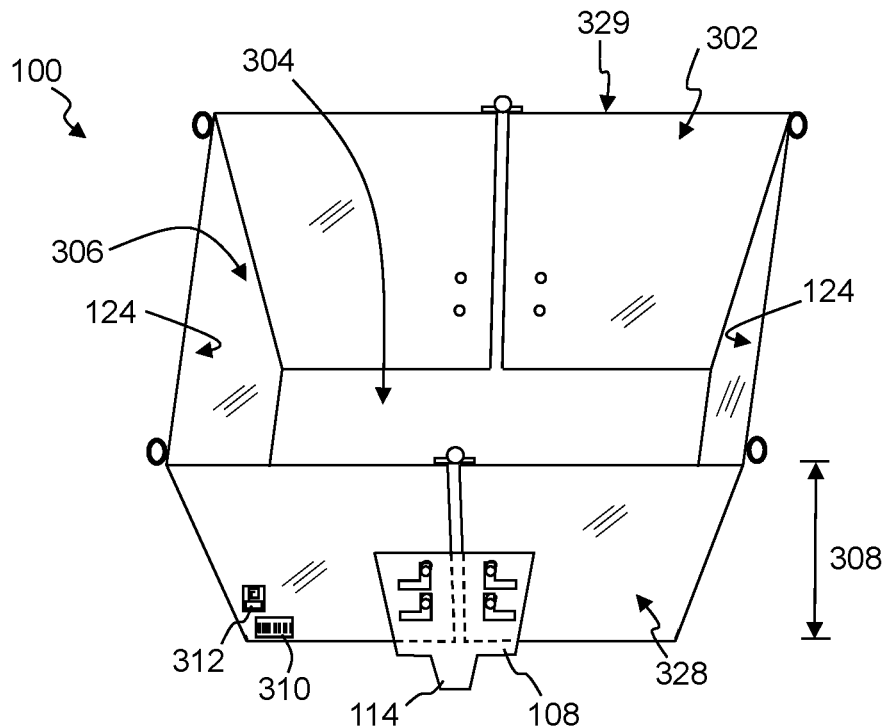
FIG. 3 illustrates a simplified perspective view of an exemplary retail product delivery system 100 in the closed state or position, in accordance with some embodiments.

FIG. 1 illustrates a simplified block diagram plane view of an exemplary retail product delivery system 100 including a package carrier system 101 in a closed, locked and/or package retention state, in accordance with some embodiments. FIG. 2 illustrates a simplified block diagram plane view of the exemplary retail delivery system 100 in an unlocked or product release state, in accordance with some embodiments. FIG. 3 illustrates a simplified perspective view of an exemplary retail product delivery system 100 in the closed state, in accordance with some embodiments. Referring to FIGS. 1-3, the delivery system 100 includes a package support frame 102 having at least two package supports or frames 104, at least one pivot coupler 106, at least one release plate 108 including one or more sets of at least one angled locking grooves 110, and one or more sets of at least one groove pins 112. A release tab 114 is integral with or is secured with the release plate 108, and extends away from the package support frame.

In some embodiments, the package supports 104 have a generally "C" shape or open cubic shape (when viewed from above looking into the package cavity) with the two package supports positioned with the openings of the "C" shape oriented facing each other and in some instances are mirror configurations of each other. The first and second package supports are each secured with at least one pivot coupler 106 that pivotably secures the first package support 104 with the second package support 104, and defines a package cavity 302 into which at least one package can be positioned for delivery. In some implementations, the pivot coupler 106 is secured proximate a top 116 of the package supports 104. The pivot coupler, however, can be secured with the package supports at other locations while continuing to allow at least one of the package supports to move at least at a base 118 of the package support away from the base 118 of the other package support. Typically, one or more hanging or suspension supports 126 are secured with each of the package supports 104 and/or the pivot couplers 106. The suspension supports can be configured to suspend the package carrier system and a package carried in the delivery system to be delivered while positioned within the package support frame. Further, the suspension supports may include one or more apertures in the frame, eye-bolts, hooks, handles, cables, lines, rods, bars or other such suspension devices that can cooperate with the hanging supports. For example, the suspension supports can be configured to cooperate with one or more cables that can cooperate with an unmanned vehicle that suspends the package support frame and package carried by the package support frame.

In some embodiments, the one or more pivot couplers 106 include one or more hinges, one or more flexible tabs (e.g., plastic, rubber, leather, silicon, aluminum, and/or other such material), one or more springs, one or more pivot joints, other such pivot coupling devices, or a combination of two or more of such pivot coupling devices. The pivot coupler 106 is further secured with the package supports to enable a base 118 of at least a first package support to pivot away from a base 118 of the second package support, and in some instances, allow both package supports to pivot relative to the other package support.

Figure 4A:
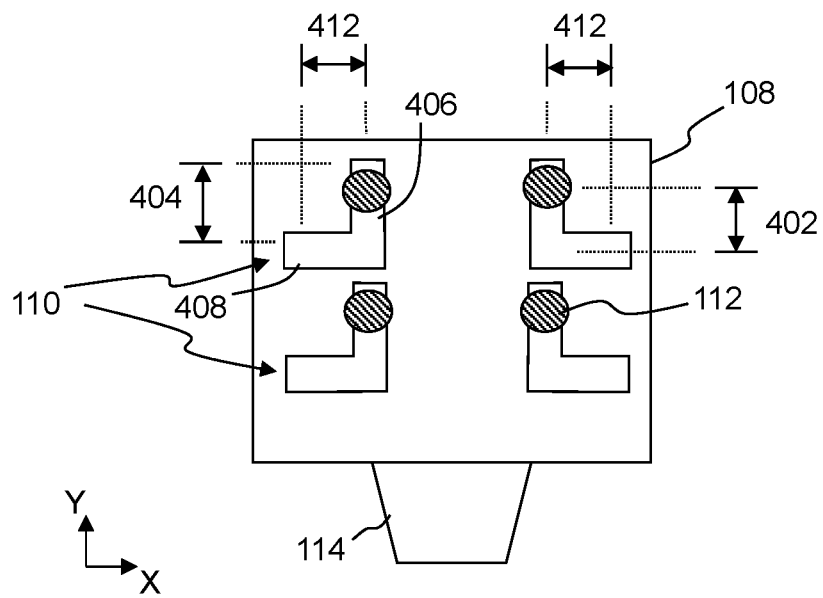
FIGS. 4A-4C illustrate simplified block diagrams of plane views of exemplary release plates cooperated with sets of groove pins, in accordance with some embodiments.
Figure 4B:
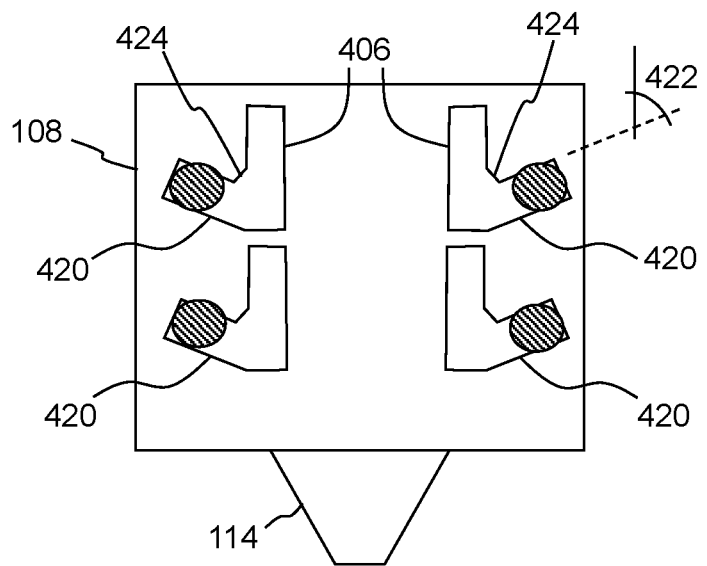
Figure 4C:
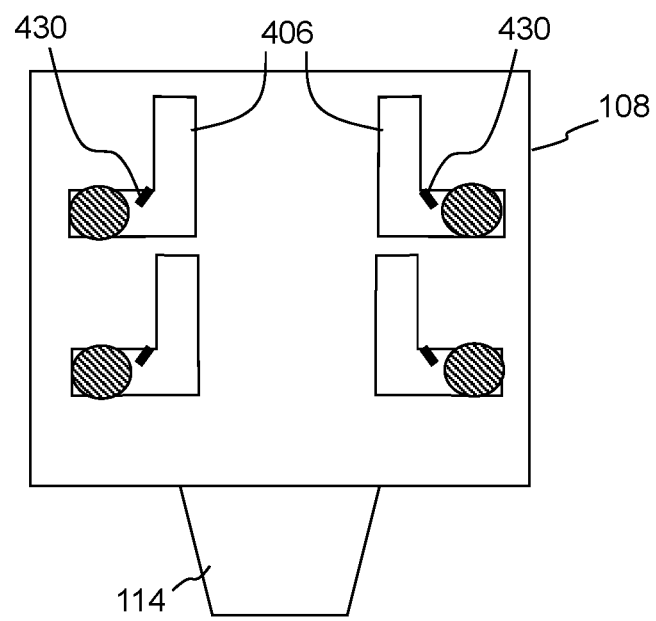

FIGS. 4A-4C illustrate simplified block diagrams of plane views of exemplary release plates 108 cooperated with two sets of groove pins 112, in accordance with some embodiments. Referring to FIGS. 1-4C, one or more release plates 108 are cooperated with the first and second package supports 104. In some implementations, one or more release plates are each positioned across a seam, joint or other such separation 120 between the first package support and the second package support. Further, in some embodiments, the delivery system 100 includes at least two release plates, each cooperated on opposing longitudinal sides 328, 329 of the package support frame and extending between the two package supports 104. Each release plate includes a set of at least one locking grooves 110 positioned in the release plate and each locking groove configured to cooperate with a groove pin 112. Each groove pin 112 is secured with one of the package supports 104. In some embodiments, the groove pins are secured in a fixed location relative to the respective package support 104 and extend from an exterior surface of the longitudinal sides 328, 329 of the respective package support. Each of the locking grooves is cooperated with at least one of the groove pins in such a way to allow the release plate 108 to move relative to the groove pins and package supports and/or allow the package supports to move relative to the release plate. In some embodiments, the groove pins are slidably positioned within a respective one of the sets of locking grooves allowing the release plate to move relative to the package supports 104 while restricted by the configuration of the locking grooves.

Again, at least one of the release plates, and typically each of the release plates includes a release tab 114. The release tab is formed to extend beyond the base 118 of the first and second package supports 104 by at least a threshold distance 402. In some embodiments, the threshold distance is typically dependent on at least the dimensions of the locking groove 110. For example, in some implementations, the release tab extends below the base 118 of the package supports by at least a height 404 of a locking portion of the locking groove 110. The release tab is configured to contact a surface (e.g., a delivery surface where the product is to be delivered). The weight of the package support frame and/or the package supported within the package cavity 302 cause the package supports and/or the release plate to move relative to each other causing an unlocking with the set of at least one locking grooves 110 sliding along the respective one of the set of at least one of the groove pins 112 such that at least the base 118 of the first package support pivots away from the base 118 of the second package support enlarging a package release aperture 304 formed by the bases of the first and second package supports and further causing an increase in distance between tapered lateral sides 124 along lateral sides of each of the package supports 104. By enlarging the release aperture 304, a package carried by the delivery system 100 is allowed to drop through the release aperture and out of the package support frame 102.

Still referring to FIGS. 1-4C, in some embodiments, angled-shaped locking grooves are positioned such that when the release plate moves relative to the groove pins in response to the release tab contacting a surface, the movement causes each of the set of one locking grooves to move along at least a portion of a height of a generally vertical section 406 of the angled-shaped groove and along at least a portion of a length of a generally lateral section 408 of the angled-shaped groove enabling a separation of the base of at least one of the package supports from the base of the other package support causing the enlarging of the package release aperture. In some instances, for example, each locking groove 110 of one or more sets is configured in a generally L-shaped locking groove. With such configurations, the release plate 108 is positioned in the locked state when the respective one of the set of groove pins 112 is positioned in a generally vertical section 406 of the L-shaped groove, and is in a release state when the respective one of the set of at least one of the groove pins is positioned in a lateral or generally lateral section 408 (e.g., horizontal) of the L-shaped groove.

In some embodiments, each of the L-shaped locking grooves 110 is positioned with the respective one of the set of at least one groove pins 112 positioned in the vertical section 406 such that the release plate 108 and/or the groove pins 112 move in response to the release tab 114 contacting a surface and the first release plate slides relative to one or both of the package supports 104 causing each of the set of at least one locking grooves to move along at least a portion of a height 404 of the vertical section of the L-shaped groove and one or both of the package supports 104 pivot relative to the other of the package support such that respective groove pins of the one or more sets of groove pins slides along at least a portion of a length of the lateral section of the L-shaped groove enabling an increase in the separation 202 of the base 118 of at least the first package support relative to the base of the second package support and causing the enlarging of the package release aperture 304. When in the locked position gravity helps to maintain the release plate in the locked position preventing the package supports from separating. As such, the package carrier system can be used in delivery methods that may encounter bumps, rapid changes in acceleration, rapid changes in altitude, and other such conditions, without the delivery system 100 unintentionally opening.

In some embodiments, the release plate 108 includes a set of one or more locking grooves 110 that are configured to cooperate with a corresponding one of a set of one or more groove pins 112 secured with the first package support 104, and further includes a set of one or more locking grooves 110 that are configured to cooperate with a corresponding one of a set of one or more groove pins 112 secured with the second package support 104. For example, a release plate may be configured with a first set of at least a first locking groove, and a second set of at least a second locking groove. A first groove pin secured with the first package support can cooperate with the first locking groove, and a second groove pin secured with the second package support can cooperate with the second locking groove. Further, the lateral section 408 of the first locking groove extends away from the second package support and the lateral section 408 of the second locking groove extends away from the first package support. This allows each of the bases of the package supports 104 to pivot at least a distance 412, which is dependent on the width of the lateral section (and the distance between the groove pins and the bases of the package supports). The lateral sections can be configured to provide the desired separation 202 between the bases 118 of the package supports 104. With two locking grooves in opposite orientations, each of the first and second package supports 104 can move allowing double the distance in separation 202 between the bases 118 of the first and second package supports.

In some embodiments, the weight of the package supports 104 and gravity cause the release plate to return to the closed position allowing the package supports to return to the closed position. Accordingly, in such embodiments the package carrier system automatically returns to the closed state when the weight is released from the release tab (e.g., by raising the package support frame). Some embodiments additionally include one or more springs or other biasing mechanisms to aid in returning the support packages and release plate to closed positions.

Further, in some embodiments, the package supports 104 are formed with tapered lateral sides 124. The first package support can have a first tapered side 124 that tapers toward the second package supports along at least a portion of a height of its lateral side. Similarly, the second package support can have a tapered side 124 that tapers toward the first package support along at least a portion of a height of its lateral side. The tapered sides result in a package release aperture 304 that has a smaller area than an area of the package receiving aperture 306, which is separated by a distance 308 from the bases 118 of the first and second package supports. In some instances, the distance is equal to a height of the package supports.

FIG. 4B shows an exemplary release plate with each locking groove 110 of one or more sets being configured in a generally L-shaped locking groove with the lateral sections 420 oriented at an angle 422 of less than 90 degrees relative to the vertical section. The angle 422 can help to retain the groove pins within the lateral sections and thus maintain the package support frame in an open state with the bases of the first and second package supports separated. Additionally or alternatively, the locking grooves may, in some implementations, include a rounded or tapered transition 424 between the vertical section 406 and the lateral section 420. This can allow the groove pins to more easily transition between the vertical sections and the lateral sections, which thus provides an easier movement of the first and second package supports 104 at least between the closed position and the open position.

Some embodiments include a latching mechanism 430 (see FIG. 4C) that can maintain the release plate in the open position and retain the groove pins within the lateral section even after the weight is removed from the release tab (e.g., by lifting the package carrier system 101). The latching mechanism can be implemented through one or more of a gravity biased lever arm, spring biased lever arm, rotational latch, magnetic latch, and/or other such mechanisms. For example, the spring biased lever arms can be configured to pivot to allow the groove pins to pass the lever arms and the biasing pushes the lever arms down to prevent the release plate from moving down and preventing the first and second package supports from returning to the closed position. Other embodiments may include magnets on the release plate that magnetically couple with the groove pins when in the open position. The magnets may be permanent magnets, electrically activated magnetics, or the like. In some instances, the release plate may be fixed and unmovable relative to a first package support while moveable relative to the second of the package supports. In such a configuration, one or more locking grooves would be formed in the release plate proximate the second package support and each cooperated with at least one groove pin secured with the second package support.

Figure 5:
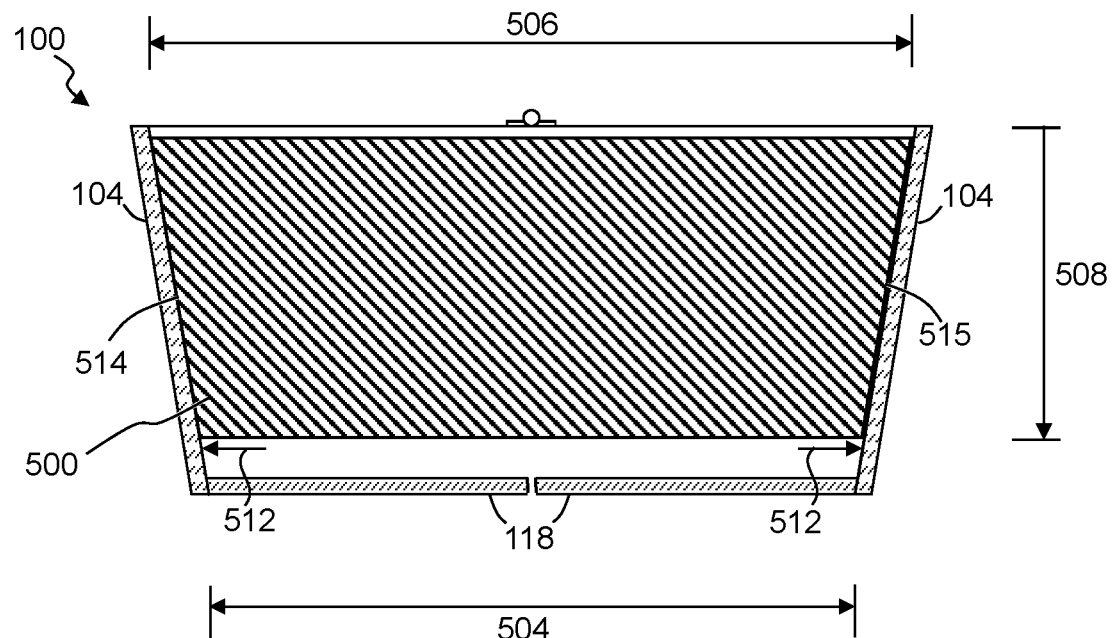
FIG. 5 illustrates a simplified cross-sectional view of a delivery system in a locked state, in accordance with some embodiments.

FIG. 5 illustrates a simplified cross-sectional view of a delivery system 100 in a locked state with a transport package 500 positioned within the package cavity 302, in accordance with some embodiments. It is noted that the transport package 500 is illustrated with lateral tapered walls 514, 515; however, the package carrier system 101 operates with other shaped packages including but not limited to rectangular, cubic, and other such relevant shapes that can engage the package supports 104 and be supported by the package support frame 102. The tapered sides 124 are positioned relative to the package receiving aperture and configured to receive a package to be delivered. Further, the tapered sides are configured to allow a package having a length greater than the length 504 of the release aperture 304 when the package carrier system is in the closed state and less than a length 506 of the package receiving aperture 306 to contact the tapered sides 124 at some distance or threshold depth 508 into the package cavity 302. In some implementations the threshold depth 508 is prior to the bases 118 of the package supports 104. In other instances, the package may extend beyond the bases 118 while still supported by the package supports. The threshold depth 508, however, typically ensures that the package does not extend below the release tab 114, and typically is above the bottom of the release tab by at least a distance to allow the release plate to transition to the unlocked position and allow the groove pins to slide along the lateral sections 408 of the locking grooves. The contact between the lateral sides 124 of the package supports 104 and the package induces lateral forces 512 by the walls of the package on the tapered sides 124 of the package supports when the package is supported by the package support frame 102.

In some embodiments, the interior surfaces of the package supports 104 may have a rubber coating, may have a rough surface, and/or may have other such mechanisms to further enhance the retention of the transport package 500 from falling through the release aperture, which in some embodiments is wide open. Some embodiments are further configured to allow the release tab location to be adjusted relative to the base 118 of the package supports 104 and/or the release plate 108. In some instances, for example, multiple predefined set positions may be selected, while in other instances a free range of movement within a threshold is allowed. For example, one or more release mechanisms (e.g., threaded bolt and nut, spring biased clamp, etc.) can allow the release tab to be adjusted to change the distance between the bottom of the release tab and the bases 118 of the package supports.

Figure 6:
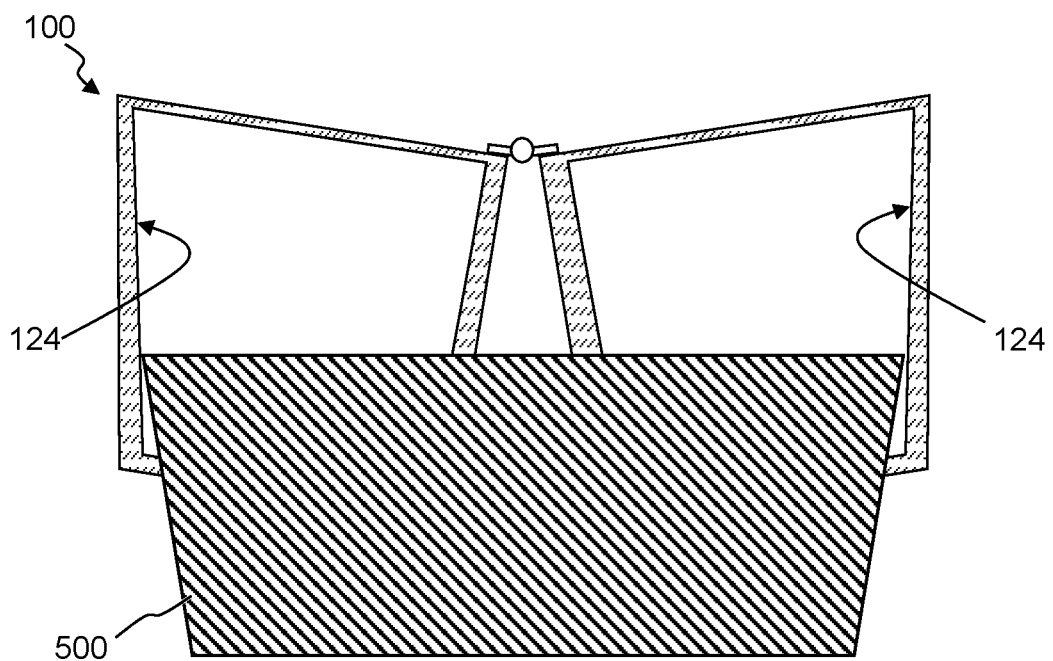
FIG. 6 illustrates a simplified cross-sectional view of a delivery system in an unlocked state, in accordance with some embodiments.

FIG. 6 illustrates a simplified cross-sectional view of a delivery system 100 in an unlocked state such that the base 108 of the first package support 104 is separated from the base of the second package support with a package 500 passing through the package release aperture 304, in accordance with some embodiments. In response to the release tab 114 contacting a delivery surface, the release plate is activated such that the groove pins 112 slide along the locking grooves 110 allowing the bases of the first and second package supports to separate increasing the package release aperture 304 as well as increasing the separation between the tapered side 124 over at least a portion of a height of the tapered sides. This increased separation is greater than the length 502 of the package 500 allowing the package to drop down through the package support frame to be deposited on the delivery surface. The package support frame can then be raised separating the package from the delivery system and leaving the package on the delivery surface.

Referring to FIGS. 1-6, the first and second tapered sides 124 of the package supports 104 are tapered to induce the lateral forces 512 by the package 500 on to the first and second tapered sides 124. Further, these induced lateral forces aid in causing the set of locking grooves to slide along the respective one of the groove pins in response to movement between the release plate 108 and the first and second package supports 104. For example, the lateral force enhances the movement of the groove pins along generally lateral sections 408 of the locking grooves aiding in causing at least the base 118 of the first package support to pivot away from the base of the second package support to enlarge the package release aperture. The degree or angle of tapering of the tapered sides 124 relative to the bases 118 of the package supports 104 can be configured based on expected packages to be transported by the delivery system, expected weights of packages to be transported, dimensions of the expected one or more packages to be transported, and/or other such factors. The forces on the tapered sides 124 can be represented as a lateral vector force generally perpendicular to gravity, and a gravitational vector force in a direction parallel to gravity. The magnitudes of the lateral vector force and the gravitational vector force are dependent on the tapered angle 130. Further, the first tapered side of the first package support and the second tapered side of the second package support further inhibit movement of the package 500 beyond a threshold distance or depth 508 toward the package release aperture when the release plate is in a locked state or position. In some embodiments, the tapered sides 124 provide the reduced length of the package carrier system proximate the bases 118 that is less than the length of the package and prevents downward movement of the package until the release plate is activated and the first and/or second package supports move to increase the length of the release aperture allowing the package to drop. The tapered angle 130 can be selected to achieve the desired reduced length proximate the bases and/or to achieve the desired lateral force on the package supports 104 while inhibiting downward movement of a transport package while positioned within the package carrier system.

The size of the package carrier system 101 and/or the package cavity 302 can vary based on one or more factors, such as but not limited to expected size of packages to be carried, expected weight of packages to be carried, a method of transport (e.g., truck, human, unmanned ground vehicle, unmanned aerial vehicle, etc.), lateral force attempting to be induced, other such factors, or a combination of two or more of such factors. In some implementations, the package carrier system is sized and/or shaped to be consistent with existing baskets, totes or the like that are used in delivering packages. Further, the package carrier system can be constructed from plastic, metal, paper, cardboard, fiberglass, fiberglass enforced and/or infused paper, rubber, other such material, or a combination of such material. Further, the package support frame is typically configured to be sufficiently rigid to limit or avoid deflection of at least the package supports based on a threshold force being applied on the package supports (e.g., thickness of plastic ribbing and/or crossing pattern are sufficient to resist flexing in response to a 20 lbs. transport package 500 being positioned to abut against the two package supports 104). This threshold may be based on the package having tapered lateral walls consistent with the tapered package supports, while in other instances, the threshold may ensure support of a 20 lbs. rectangular package with bottom edges resting on the package supports. Some embodiments utilize reinforcements (e.g., metal, thicker plastic, etc.) to provide the threshold support capacity.

Figure 7:
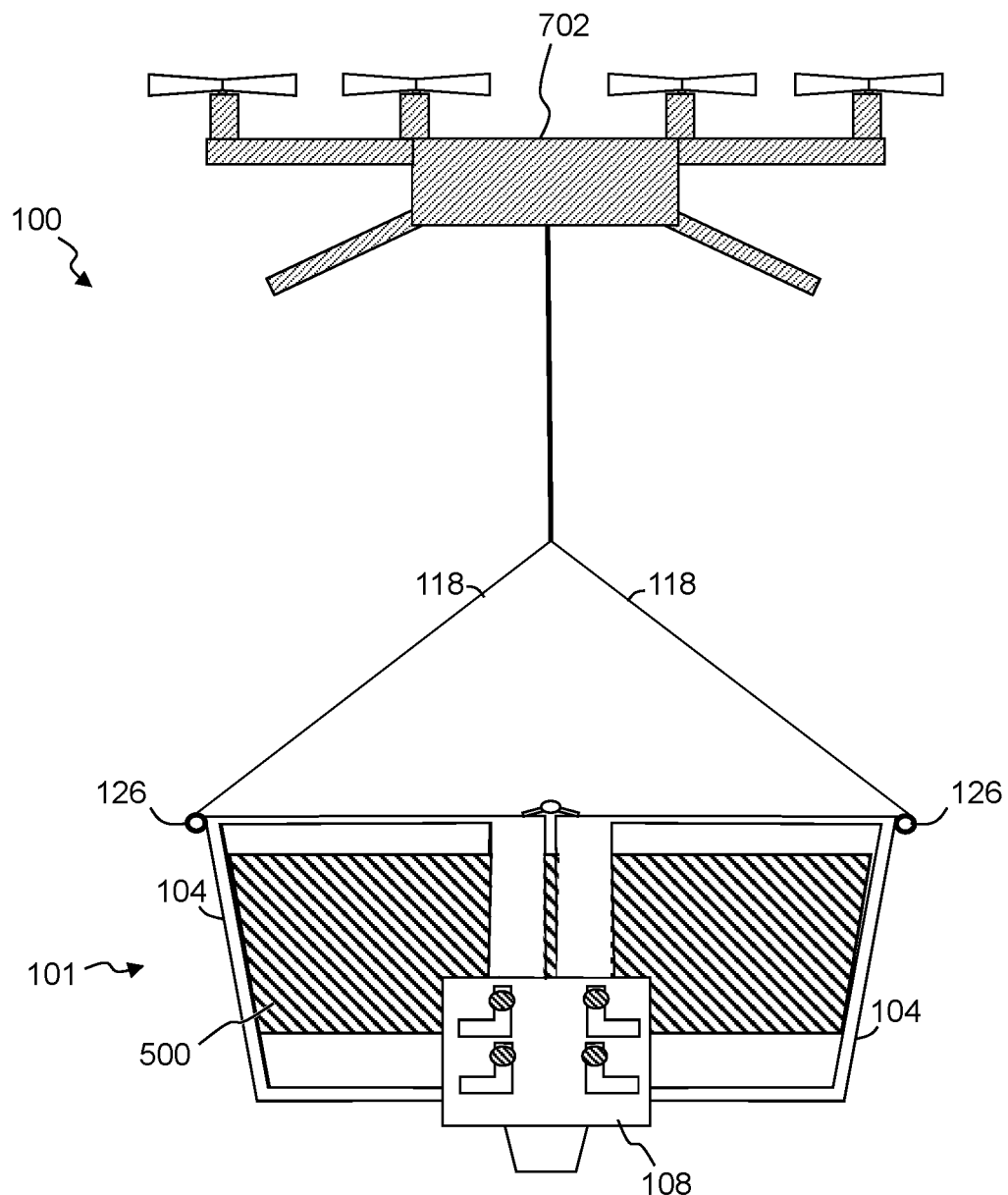
FIG. 7 illustrates a simplified block diagram of the delivery system, in accordance with some embodiments.

As described above, in some embodiments, the delivery system can include one or more suspension supports 126 coupled with each of the first and second package supports 104. The suspension supports allow the package support frame to be suspended and the package to be delivered while positioned within the package support frame. FIG. 7 illustrates a simplified block diagram of the delivery system 100, in accordance with some embodiments, with the package carrier system 101 and package 500 supported by an unmanned vehicle 702 (e.g., an unmanned aerial vehicle (UAV), unmanned ground vehicle (UGV), ground based vehicle, water transport vehicle, or other such vehicle). In some embodiments, an unmanned aerial vehicle 702 supports the package support frame 102 and a package 500 positioned within the package support frame. The unmanned aerial vehicle is configured to lower the package support frame and package from a height above the delivery surface until causing the one or more release tabs 114 to contact the surface inducing the respective one or more release plates to move relative to the package supports 104 (and/or the package supports 104 to move relative to the release plates) such that the set of locking grooves each slide along a respective groove pin of one or more sets of groove pins enabling a base 118 of at least the first package support to pivot away from the base of the second package support and enlarging the package release aperture. The aerial vehicle may lower the package support frame and package by lowering its altitude, and/or may include a lowering mechanism, such as a crane system, an extendible accordion mechanism or hinge, or other such lowering mechanism. Similarly, the delivery system may be configured with handles cooperated with the suspension supports 126, and a delivery person can carry the delivery system and lower the delivery system until the system transitions to an unlocked or open state with at least one of the first and second package supports pivoted to increase the length of the release aperture 304. In other embodiments, the delivery system may utilize a ground based unmanned vehicle that transports the package support frame and package to a delivery location and lowers the package support frame to trigger the release plate unlocking the system allowing the first and/or second package support to pivot and release the package to drop through the release aperture.

Some embodiments utilize a package 500 having a predefined shape to cooperate with the package support frame 102 in delivering the package. In some embodiments, the package 500 provides a retail product delivery transport package that has a base and a set of at least two tapered walls. The two tapered walls extend at an angle from the base and to a height from the base of an opening level defining part of an opening of the package. The two tapered walls of the set of tapered walls are separated by a length of the base of the package and extend from the base at the angle such that a distance between the tapered walls at the opening is greater than a distance between the tapered walls at the base. Further, at least the two tapered walls are configured to frictionally engage the first and second tapered package supports 104 (e.g., package carrier walls) of the product delivery package carrier system 101 to prevent the transport package from extending beyond a threshold depth into the package cavity 302 of the package support frame. Typically, the package 500 includes a set of at least one vertical wall that extends from the base and is substantially perpendicular to the base along a height of the vertical wall.

Figure 8:
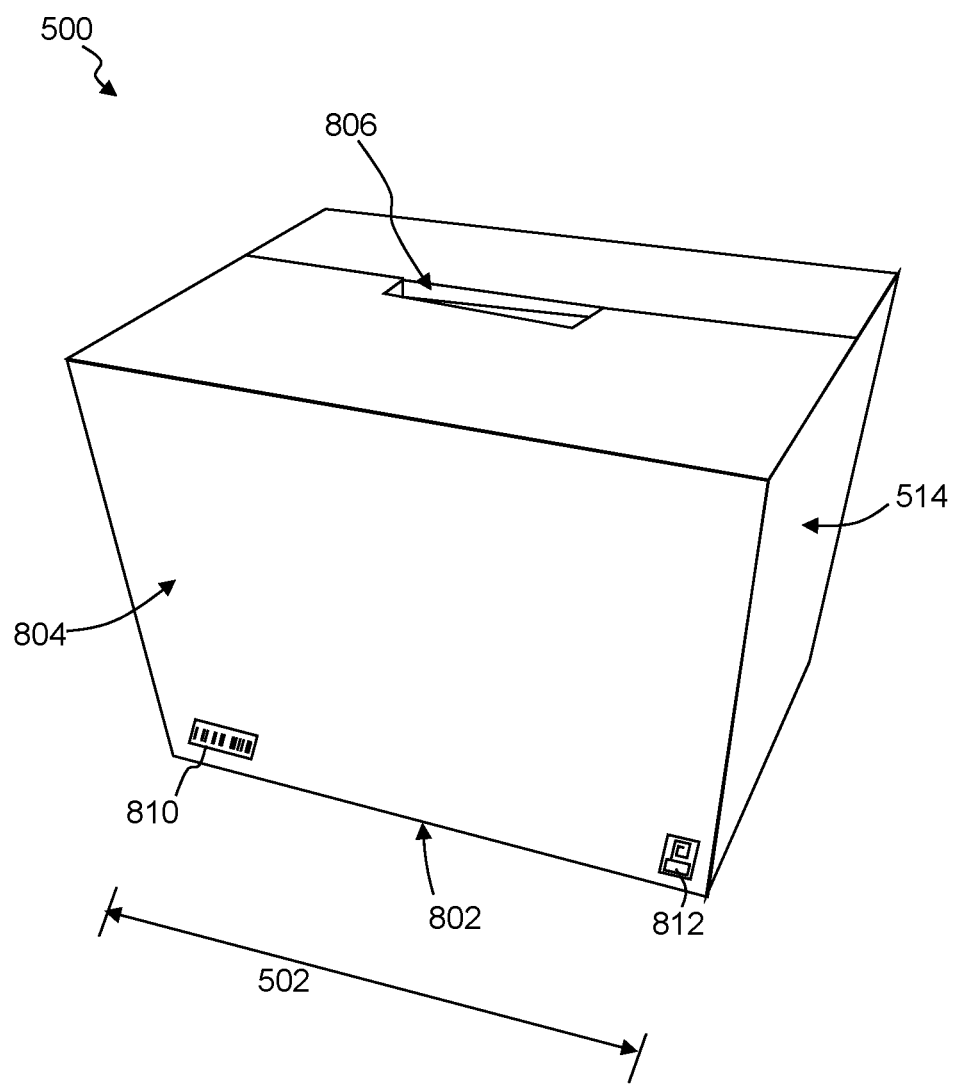
FIG. 8 illustrates a simplified perspective view of an exemplary delivery transport package, in accordance with some embodiments.
Figure 9:
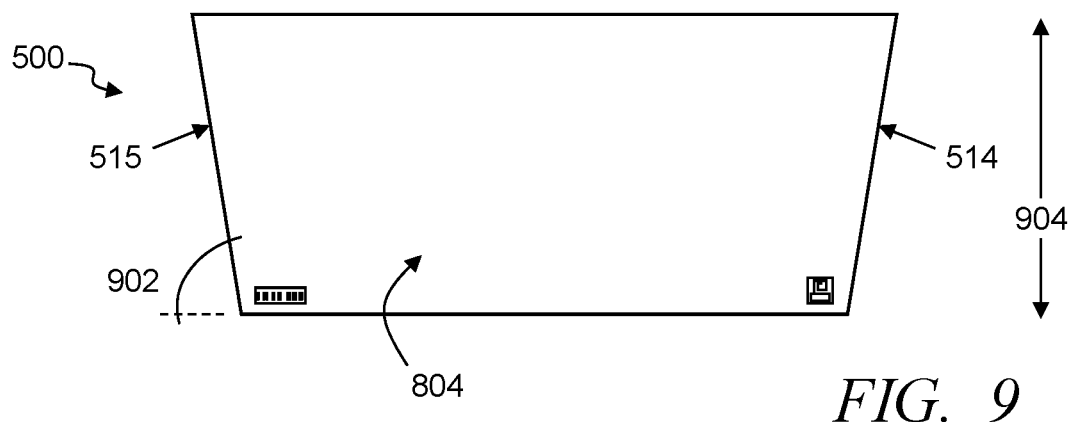
FIG. 9 illustrates a simplified plane, side view of an exemplary transport package, in accordance with some embodiments.
Figure 10:
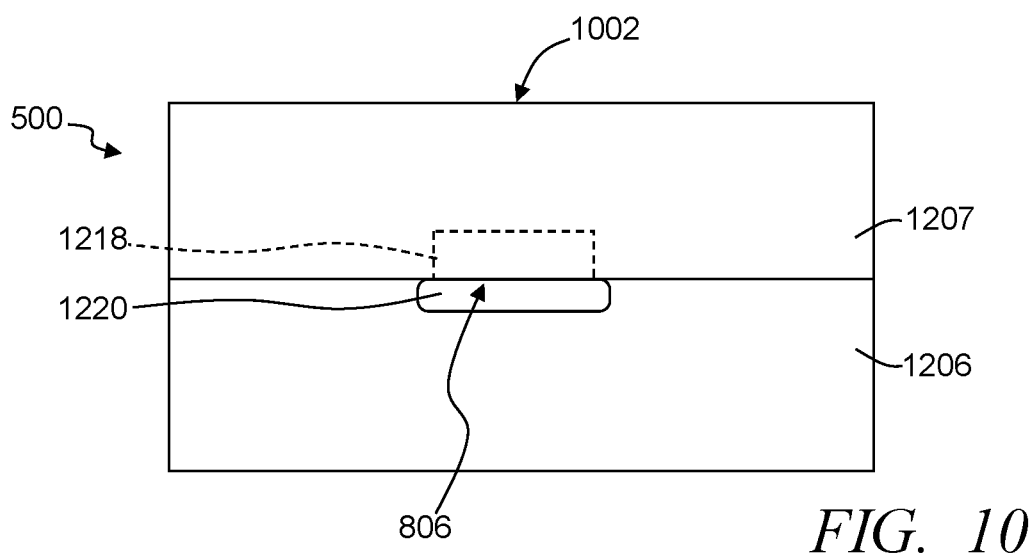
FIG. 10 illustrates a simplified top, plane view of an exemplary transport package, in accordance with some embodiments.
Figure 11:
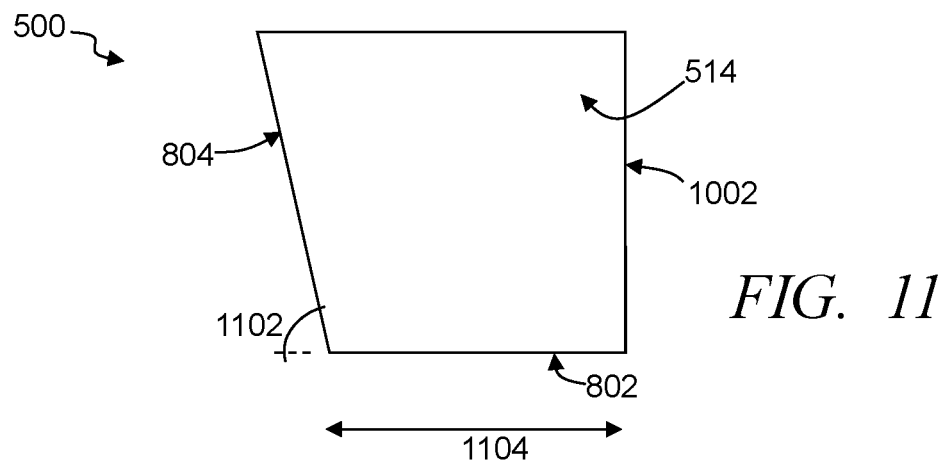
FIG. 11 illustrates a simplified plane, end view of an exemplary transport package, in accordance with some embodiments.
Figure 12:
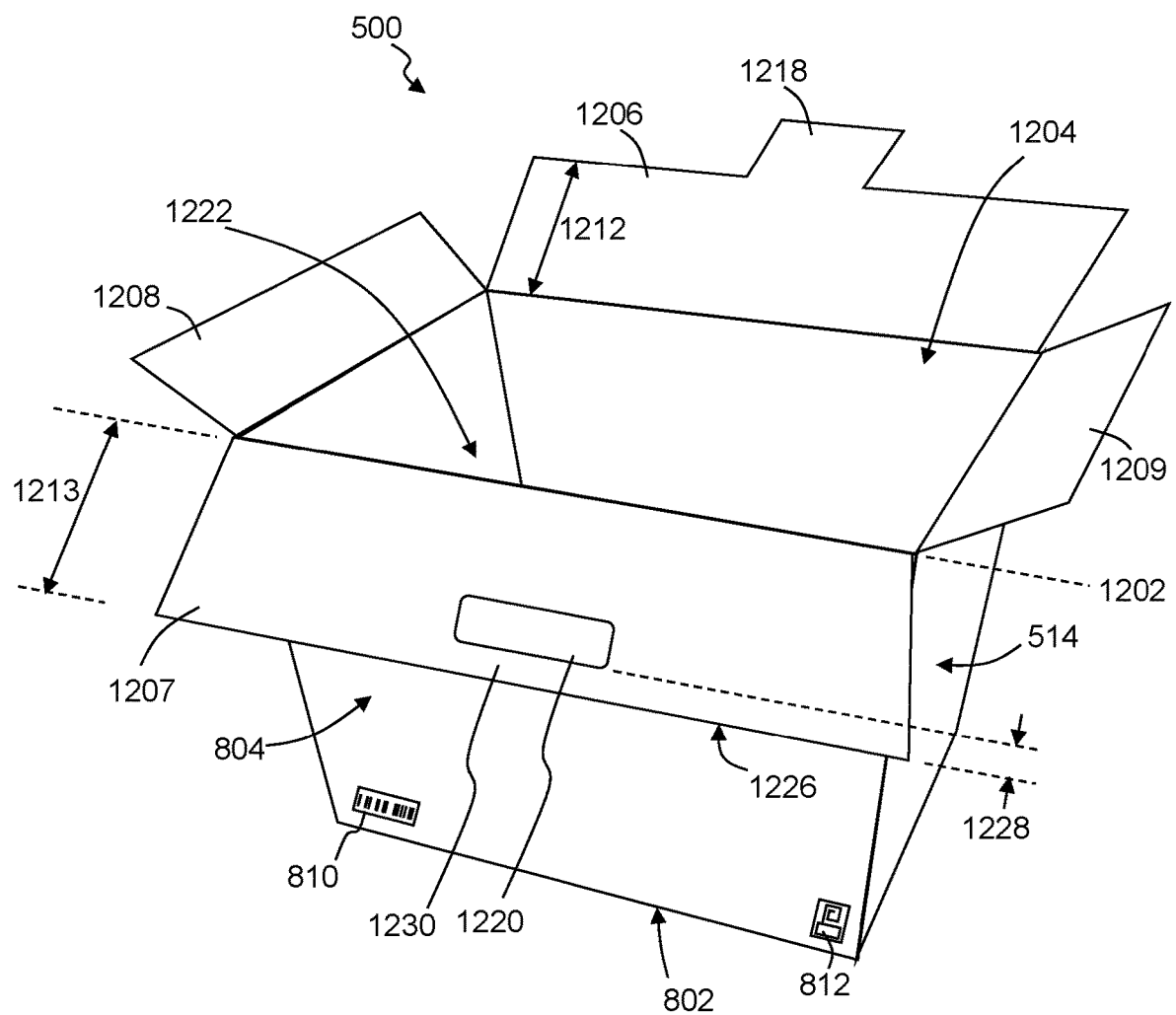
FIG. 12 illustrates a simplified perspective view of an exemplary delivery transport package with the package open, in accordance with some embodiments.

FIG. 8 illustrates a simplified perspective view of an exemplary delivery transport package 500, in accordance with some embodiments. FIG. 9 illustrates a simplified plane, side view of an exemplary transport package 500, in accordance with some embodiments. FIG. 10 illustrates a simplified top, plane view of an exemplary transport package 500, in accordance with some embodiments. FIG. 11 illustrates a simplified plane, end view of an exemplary transport package 500, in accordance with some embodiments. FIG. 12 illustrates a simplified perspective view of an exemplary delivery transport package 500 with the package open, in accordance with some embodiments. Referring to FIGS. 8-12, the transport package 500 includes a base 802 and a set of tapered walls. In some embodiments, the set of tapered walls includes at least two lateral tapered walls 514-515. Each of the two tapered walls 514-515 extend at an angle 902 from the base to a height 904 from the base 802 of an opening level 1202 that defines part of an opening 1204 of the package when open. Some embodiments further include a longitudinal tapered wall 804. The longitudinal wall tapers at an angle 1102 relative to the base and extends from the base along the height of the package to the opening level 1202.

In some embodiments, the two lateral tapered walls 514-515 of the first set of tapered walls are separated by the length 502 of the base 802 and extend from the base at the angle 902 such that a distance between a first tapered wall 514 and a second tapered lateral wall 515 at the opening 1204 is greater than a distance between the first tapered lateral wall and the second tapered lateral wall at the base. Further, the first tapered wall 514 and the second tapered lateral wall 515 are configured to frictionally engage the first and second tapered package support walls 104, respectively, of a product delivery package carrier system 101 to prevent the transport package 500 from extending beyond a threshold depth 508 into the package cavity 302 of the package carrier system 101. The package 500, in some embodiments, further includes a second set of at least one wall that comprises at least a substantially vertical wall 1002 that extends from the base 802 and is substantially perpendicular to the base along a height of the vertical wall 1002.

As illustrated in at least FIG. 11, the longitudinal tapered wall 804 tapers away from the vertical wall 1002 such that the width or distance 1104 between the longitudinal tapered wall and the vertical wall 1002 increases closer to the opening 1204. Accordingly, in such embodiments the distance 1104 between a longitudinal tapered wall 804 and the vertical wall 1002 at the opening 1204 is greater than the distance between the longitudinal tapered wall 804 and the vertical wall at the base 802. Further, the longitudinal tapered wall extends from the base along the height and is positioned extending between the first tapered wall 514 and the second tapered wall 515 defining the length 502 of the transport package 500.

The size of the transport package 500 and/or the package carrier system 101 can vary depending on one or more factors, such as but not limited to size of products expected to be transported, weight of products expected to be transported, method of delivery, size and/or weight capacities associated with a method of delivery, and/or other such factors. As one non-limiting example, the transport package in some implementations may be constructed with a height of about 9.75 inches, a width of the lateral tapered walls 514-515 of about 8.25 inches at the base and about 8.5 inches at the opening level (which defines the angle 1102 of tapering of the longitudinal tapered wall 804 relative to the base of about 88 degrees); a length of the longitudinal tapered wall 804 along the base of about 9.5 inches and along the opening level of about 11.5 (which defines the angle 902 of tapering of the lateral tapered walls 514-515 relative to the base of about 84 degrees). The package support frame 102 can be assembled with similar interior dimensions such that the exterior dimensions of the transport package mirror the interior dimensions of the package support frame. As another non-limiting example, the transport package may be constructed with a height of about 9.0 inches, a width of the lateral tapered walls 514-515 of about 8.25 inches at the base and about 8.75 inches at the opening level (which defines the angle 1102 of tapering of the longitudinal tapered wall 804 relative to the base of about 88 degrees); and a length of the longitudinal tapered wall 804 along the base of about 11.0 inches and along the opening level of about 12.0 (which defines the angle 902 of tapering of the lateral tapered walls 514-515 relative to the base of about 88 degrees). Again, the dimensions of the package support frame and transport packages can vary depending on one or more factors.

In some embodiments, the transport package 500 includes a set of one or more folding lid flaps 1206-1209. A first lid flap 1206 may be included that extends from and/or is part of the vertical wall 1002. The first lid flap is configured to fold at the opening level 1202. When folded, the first lid flap is configured to extend over at least a portion of the opening 1204. A second lid flap 1207 may extend from and/or be part of the longitudinal tapered wall 804. The second lid flap can further be configured to fold at the opening level 1202 and extend over at least a portion of the opening 1204. In some instances, the first and second lid flaps are configured to fold over a portion of the opening that is not covered by the other of the lid flaps.

Further, in some embodiments the first lid flap 1206 has a width 1212 that is greater than a width of the second lid flap 1207, or vice versa, such that when folded the first and second lid flaps overlap by a distance. Additionally, the first lid flap may include a handle tab 1218, and the second lid flap 1207 can include a tab aperture 1220 or punch-out. The tab aperture is separated from an edge 1226 of the second lid flap by a distance 1228 defining a handle support 1230 formed in the second lid flap 1207. The tap aperture 1220 can be positioned to align with and receive at least a portion of the handle tab 1218 when the handle tab is folded through the tab aperture 1220 to extend back toward the fold of the vertical wall 1002 and along a portion of the width 1212 of the first lid flap. When folded, the cooperation between the handle tab 1218 and the handle support 1230 define a handle 806 of the transport package 500. Additionally, the folded handle tab can in part help to maintain the package in a closed state. Further, in some embodiments the lateral tapered walls 514-515 include first and second lateral lid flaps 1208-1209, respectively. These lateral lid flaps 1208-1209 are typically further configured to fold at the opening level 1202 and extend over at least a portion of the opening 1204. In some instances, one or both of the lateral flaps may include tab apertures (e.g., similar to the tab aperture 1220) to further cooperate with the handle tab and strengthen the handle 806.

Figure 13:
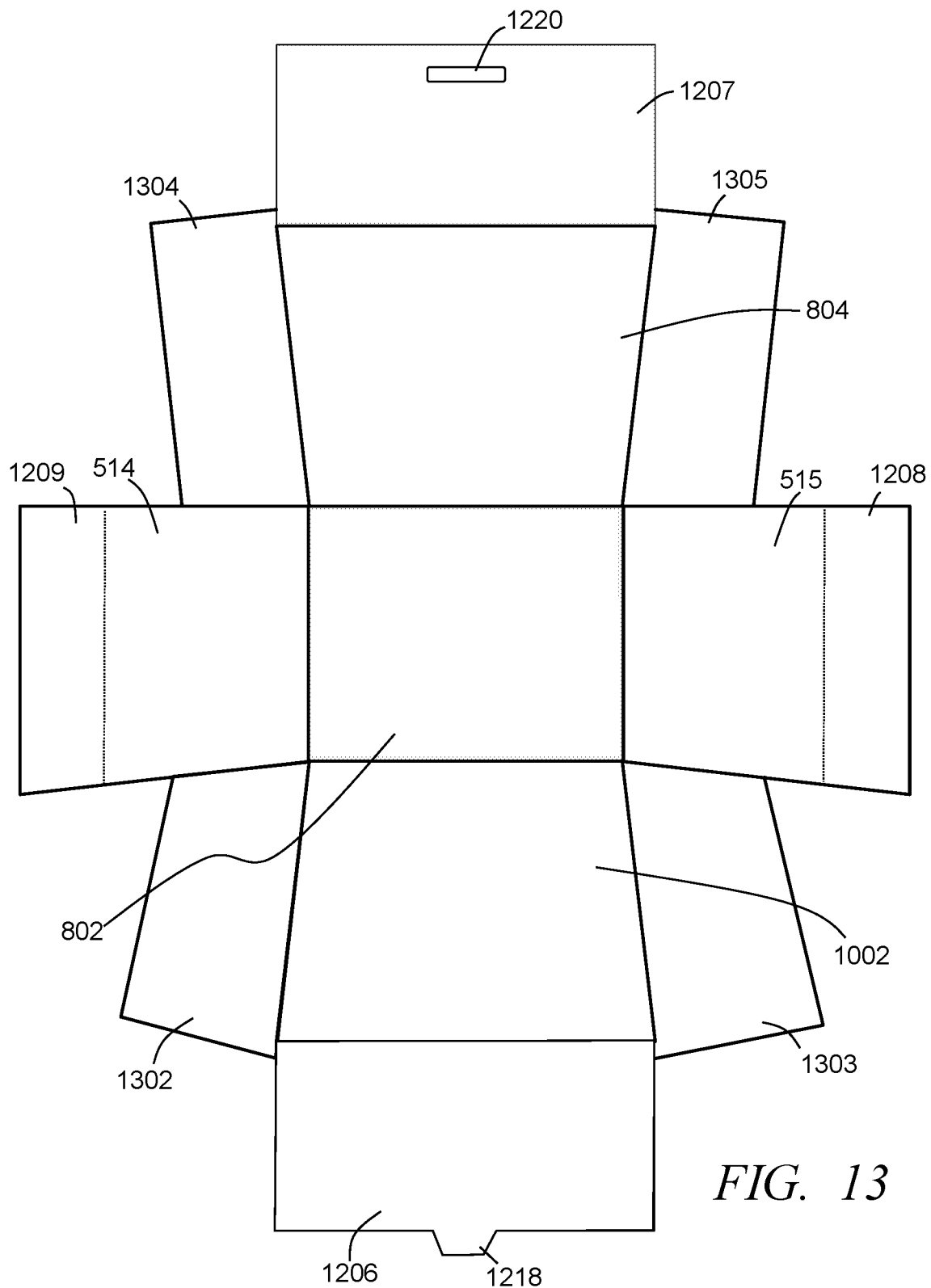
FIG. 13 illustrates a simplified block diagram of an open, unfolded plane view of an exemplary transport package, in accordance with some embodiments.

FIG. 13 illustrates a simplified block diagram of an open, unfolded plan view of an exemplary transport package 500, in accordance with some embodiments. The transport package in some embodiments is constructed such that the base 802 and at least the first and second tapered walls 514-516 are formed from a single continuous piece of material. In some instances, the longitudinal tapered wall 804 and/or the vertical wall 1002 are further formed from the single continuous piece of material forming the base 802 and lateral tapered walls 514-515. The continuous material enhances the strength and stability of the transport package 500, and enables the transport package to support greater weights at least while the lateral tapered walls 514-515 are in contact with the package supports 104 and inhibiting further downward movement of the transport package into the package cavity 302 beyond the threshold depth 508 into the package cavity. The first and second tapered walls 514-515 are separated by a distance and respectively frictionally engage the first and second package supports 104 of the package carrier system. The first tapered wall 514 induces at least a lateral force 512 on the first package support 104 in a direction away from the second package support, and the second tapered wall 515 is configured to induce a force on the second package support 104 in a direction away from the first package support. The transport package 500 can be constructed from substantially any relevant material such as but not limited to cardboard, plastic, paper, fiberglass enforced and/or infused paper, other such material, or a combination of such material. The material may be water resistant (e.g., with a plastic or wax surface), or moisture proof. In some instances the transport package may be recyclable, reusable and/or returnable for credit. Further, in some embodiments, the material used to form the transport package and/or the package support frame may be a lightweight yet stiff and strong material. The transport package may further be constructed from a material to limit weight.

Additionally, in some instances, one or more of various structures and/or materials may be used inside the transport package that can define interior compartments or sections within the package cavity. Further, various structures and/or materials can be positioned to establish interior compartments that can vary in size, shape or other such modifications depending on products being delivered, type of transport, expected weather, expected travel conditions, and the like. For example, when two items are being delivered together, and one is to be maintained below a first threshold temperature (e.g., below 40 degrees Fahrenheit) while the other is to be maintained above a second threshold temperature (e.g., above 45 degrees Fahrenheit), then interior structures and/or materials can be positioned to define separate temperature compartments within the transport package. Temperature control devices (e.g., ice packs, dry ice, heat packs, etc.) can further be incorporated into one or more compartments. As another example, some chemicals should be kept separated from food stuffs, and compartments can be defined to maintain a separation between a product with a first chemical and other food stuff. In some instances, the interior structures allow stacked compartments to be established so that items can be stacked while preventing crushing. Accordingly, the multi-purpose transport package 500 can be used with passive cooling, passive heating, as well as be used with various delivery methods (e.g., UAV, UGV, delivery person, etc.).

Further, in some implementations the material may include an insulating material and/or an insulating material may be added to an exterior or interior of one or more of the surfaces of the transport package (e.g., Styrofoam, wool, fiberglass, cotton, other such insulation material, or a combination of two or more insulating materials). For example, one or more of the first lateral tapered wall, the lateral second tapered wall, the longitudinal tapered wall, the first vertical wall, the base, and the first-fourth lid flaps can comprise insulation configured to reduce a rate of change of temperature within the product cavity defined in part by the first lateral tapered wall, the second lateral tapered wall and the first vertical wall. Additionally or alternatively, some packages may include interior and/or exterior pockets to receive passive cooling (e.g., ice, dry ice, etc.). In some instances, the package may include perforated apertures on the sides and/or base which can be popped out to increase ventilation though the package, which can be used for example to maintain a desired temperature, allow for the dispersal of steam and/or smells, and other such functions. Some embodiments include a lock or one or more apertures through which a cable or lock can be threaded to lock the transport package and/or provide a tamper resistant package.

Further, some embodiments include one or more closing tabs 1302-1305 that are formed to extend from sides of one or more of the lateral tapered walls 514-515, the vertical wall 1002 and the longitudinal tapered wall 804. The closing tabs can be folded to be positioned adjacent to and secured with an adjacent one of the lateral tapered walls 514-515, the vertical wall 1002, the longitudinal tapered wall 804 and/or another closing tab. The securing can be through substantially any relevant method such as but not limited to adhesive, staples, folding tabs and corresponding apertures, other such methods, or a combination of two or more of such methods. For example, closing tabs 1302 and 1303 can extend from the sides of the vertical wall 1002 and when folded can be placed adjacent to and secured with the first lateral tapered wall 514 and second lateral tapered wall 515, respectively; and closing tabs 1304 and 1305 can extend from the sides of the longitudinal tapered wall 804 and when folded can be placed adjacent to and secured with the first lateral tapered wall 514 and second lateral tapered wall 515, respectively. The widths of the closing tabs can vary depending on package size, expected weights to be supported by the transport package, type of adhesive or other material used to secure the closing tabs, and/or other such parameters. For example, the closing tabs may have a larger width with transport packages expected to transport larger weights, which can allow greater quantities of adhesive. In some implementations, one or more of the closing tabs may be configured with a width sufficient to allow overlap of closing tabs. The overlapping closing tabs can be secured together (e.g., adhesive, staples, folding tabs and apertures, etc.), which can increase structural stability of the transport package.

In some embodiments, the package carrier system 101 and/or one or more transport packages 500 may include one or more identifiers, which may specify a type of package carrier system or package, a unique identifier for each package carrier system or package, or other such identifiers. For example, in some implementations, the package carrier system 101 may include one or more optically scannable identifiers 310, one or more radio frequency identifier (RFID) tags 312, other such identifiers, or a combination of two or more of such identifiers. Similarly, in some embodiments, the transport package 500 further comprises one or more optically scannable package identifiers 810, one or more package RFID tags 812, other such identifiers, or a combination of two or more of such identifiers. In some embodiments, the carrier system RFID tag 312 and/or the package RFID tag 812 may be a programmable RFID tag configured to receive, for example, product identifying information of at least one product placed within a product cavity 1222 of the package defined in part by the first tapered wall 514, the second tapered wall 515 and the first vertical wall 1002. The same or an additional package RFID tag 812 may store a transport package identifier unique to the transport package, which distinguishes the transport package from other similar packages, and/or all other transport packages. In some instances, the programmable RFID tag may receive a package identifier, a delivery identifier, delivery parameter information (e.g., delivery address, access route information, etc.), or other such information. The RFID tag and/or scannable code can be used to confirm the correct package is being loaded and/or delivered. The package bar code 810 and/or package RFID tag 812 can be placed at substantially any location on or in the package. In some instances, the placement provides further information to a retail worker, delivery worker and/or customer. For example, different placements can indicate a weight threshold, a type of product, whether the product is to be maintained at a cooled temperature, whether a product is to be maintained at a heated temperature, a geographic area of delivery and/or other such information. Similarly, the color and/or printing on the outside surfaces of the package can provide similar information to workers and/or customers.

Figure 14:
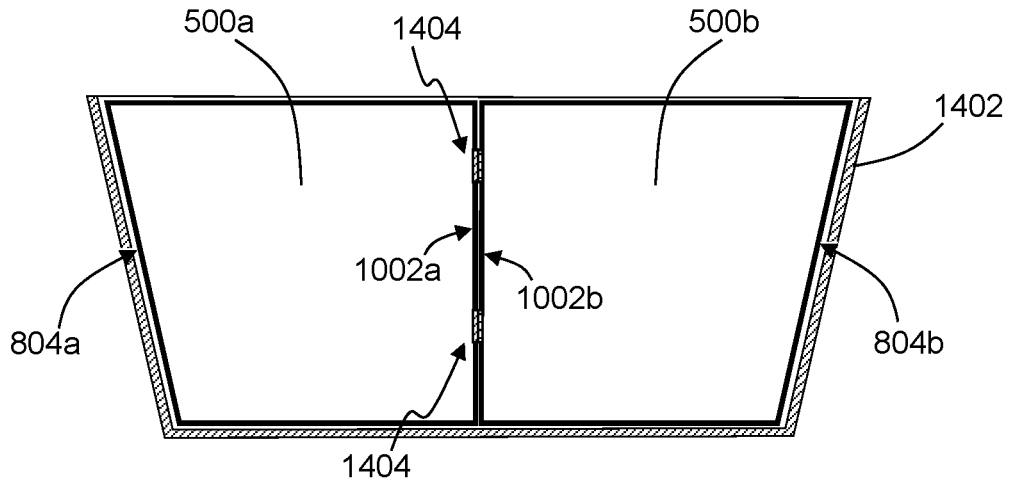
FIG. 14 illustrates a simplified partial cross-sectional view of a transport bin carrying at least two of the transport packages, in accordance with some embodiments.

FIG. 14 illustrates a simplified partial cross-sectional view of a transport bin 1402, basket tote, package carrier system 101, or other such carrier carrying at least two of the transport packages (e.g., first transport package 500a, and second transport package 500b), in accordance with some embodiments. Again, in some implementations, the transport packages 500a, 500b include longitudinal tapered walls 804a, 804b and a vertical wall 1002a, 1002b, respectively. The first vertical wall 1002a can be configured to abut against a different vertical wall 1002b of a different second transport package. The abutting of vertical walls of two transport packages allows the cooperation of the two transport packages to establish a cooperative exterior shape that is an inverse of an interior surface of a package cavity of the separate transport bin 1402 and configured to fit within the package cavity of the transport bin. Further, the dimensions of the transport packages 500a, 500b can be such that there is less than a threshold distance between their respective longitudinal tapered walls 804 and the interior surface of the transport bin 1402 to limit or prevent shifting of the transport packages within the transport bin. This allows the same transport packages 500 configured to be carried by the package carrier systems 101 to alternatively also be cooperated with other transport packages and fit into transport bins (e.g., for use in other transport methods). Further, in some implementations the longitudinal tapered walls 804 of the two adjacent packages push against the tapered sides of the transport bin 1402 and push the transport packages together.

In some embodiments, the vertical walls 1002 of one or both transport packages may include affixing systems 1404 configured to at least temporarily secure the vertical wall of a first transport package 500a with the vertical wall of a second transport package 500b. The vertical walls 1002, for example, of the transport packages (e.g., first transport package 500a) may comprise corresponding affixing systems 1404 that are secured with an exterior of the vertical walls and configured to mate with an affixing system 1404 secured with the vertical wall of the other different transport package (e.g., second transport package 500b). The affixing systems may include mating Velcro, adhesive, latches, tongue and groove structures, tabs and apertures, other such affixing systems, or a combination of two or more of such affixing systems.

The size of the transport package 500 can vary based on one or more factors, such as but not limited to, types of products to be transported, expected size of products to be transported, expected weight of products to be carried, a method of transport (e.g., truck, human, unmanned ground vehicle, unmanned aerial vehicle, etc.), lateral force attempting to be induced on a package carrier system 101, other such factors, or a combination of two or more of such factors. In some implementations, the transport packages are sized and/or shaped to be consistent with one or more package carrier systems 101 expected to be used in delivering the package. Similarly, the package carrier systems may, in some instances, be configured to be consistent with existing totes that are used in other delivery methods. Some embodiments define the size and/or shape of the transport package and/or the package carrier system to optimize space utilization, and reduce or eliminate unused space within the package carrier system which provides a more stable transport of the package. Further, some embodiments define the size and angle of the tapered walls to continue to be used with existing totes or baskets (e.g., should the package be transported without the use of the package carrier system). Further, the vertical wall enables two transport packages to readily be placed into an existing transport bin, tote, basket or the like, and/or to cooperatively mirror an interior of a product cavity of a package carrier system large enough to carry more than one transport package. Further, some embodiments are configured to enable more than two transport packages to cooperate and mirror a predefined product cavity of an existing tote or package carrier system. In some embodiments, the size of the transport package and the angles of the tapered walls are configured to hold the package securely within a package carrier system 101 or other transport bin 1402 during transport, efficiently using the available space, and to easily release the one or more transport packages at the delivery location. Further, the dimensions can be varied dependent upon one or more factors, such as a size and/or lift capability of a UAV 702 and/or UGV, size of a release aperture 304, and the like. Further, some embodiments select a transport package 500 to have dimensions to operate with an intended package carrier system 101, not be too large that it cannot readily be released upon opening of the package supports, and not be too small that the package can fall through the release aperture while the package carrier system is in a closed state and before the release plate is activated.

The package carrier system 101 can operate with packages that do not have the lateral tapered walls 514, 515 (e.g., can operate with rectangular boxes) as long as the length and/or width of the package is larger than the release aperture while the package carrier system is in the closed state. The tapered walls of the transport package, however, enable a better fit of the transport package within the package carrier system, reduce undesired movement of the transport package, reduce the likelihood of the transport package dropping out of the package carrier system, limit movement of the transport package relative to the package carrier, and provide other such benefits. Further, the lateral tapered walls 514, 515 provide for a greater distribution of weight and increased friction for holding the transport package in place relative to the package carrier system. In some embodiments, the angle 902 is selected to mimic an angle of the package supports 104. Further, the tapered package supports 104 enable the package carrier systems to be stacked and/or nested while not in use. Similarly, the lateral tapered walls 514-515 and longitudinal tapered wall 804 allow the transport packages 500 to be readily stacked or nested while not in use.

Figure 15:
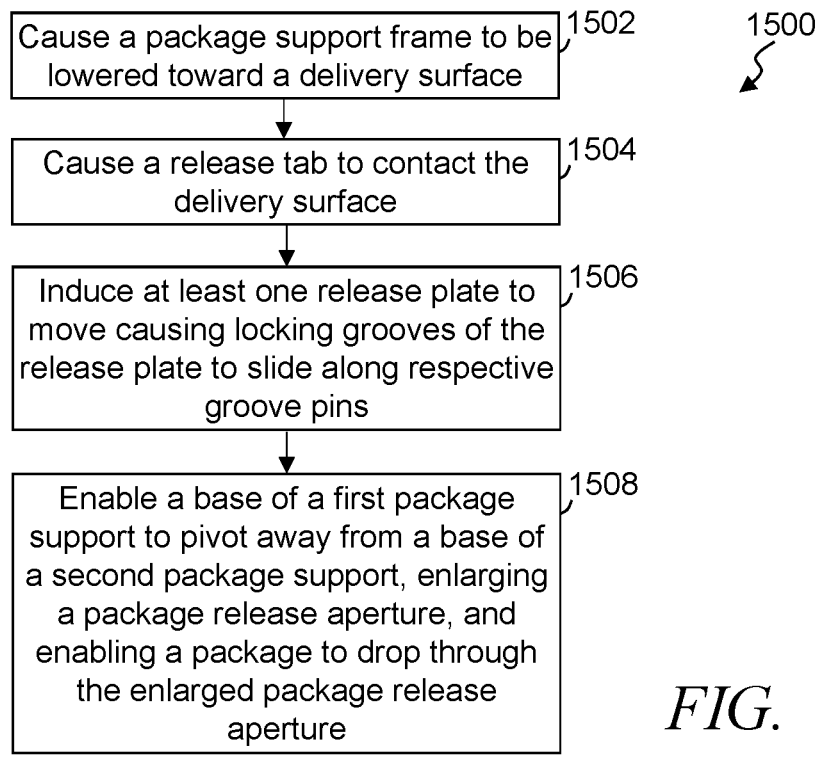
FIG. 15 illustrates a simplified flow diagram of an exemplary process of delivering a package to a delivery location, in accordance with some embodiments.

FIG. 15 illustrates a simplified flow diagram of an exemplary process 1500 of delivering a package to a delivery location, in accordance with some embodiments. In step 1502, a package support frame 102 supporting a package 500 is caused to be lowered toward a delivery surface. The lowering can be caused by a UAV 702 reducing an altitude of the UAV, activating a crane system to lower the package carrier system 101 and/or other such methods. In step 1504, one or more release tabs 114 that are cooperated with the package support frame are caused to contact the delivery surface. In some implementations, the UAV control system and/or control circuit of the UAV control system can induce the lowering to cause the release tabs 114 and/or release plate 108 to contact the delivery service. Further, the UAV control system may be implementing a delivery procedure following a delivery route and initiate delivery upon identifying a delivery destination. The delivery route information may be communicated to the UAV control system from a central delivery control system, a delivery vehicle having previously received the delivery route information and/or other such source. Further, the UAV control system may autonomously implement modifications in response to various conditions (e.g., detection of a no-fly-zone, obstacles, etc.), and/or may communicate with the central delivery system to receive further instructions.

In step 1506, one or more release plates 108 are induced to move causing a set of at least one angled locking grooves 110 of the one or more release plates to slide along a respective one of a set of at least one groove pins 112, each secured with one of the package supports 104. Again, in some embodiments the release plate includes the first release tab and is positioned across a separation 120 between two package supports 104 of the package support frame. In step 1508, a base 118 of at least one package support 104 is enabled to pivot away from a base 118 of another package support based on the set of at least one locking grooves sliding along the respective one of the set of at least one groove pins. The pivoting of one or more of the package supports enlarges a package release aperture 304, and enables the package 500 to drop through the enlarged package release aperture.

Some embodiments maintain the package support frame 102 in a locked state while causing the package support frame to be lowered with the each of the respective one of the set of at least one groove pins positioned in a vertical section of the respective one of the set of at least one locking grooves 110. In some implementations the locking grooves can include one or more L-shaped locking grooves. In inducing the release plate to move, some embodiments cause each of the set of at least one locking grooves to move along at least a portion of a height of the vertical section of the respective one of the set of locking grooves comprising an L-shaped groove, and the package support pivots such that respective groove pins of the set of at least one groove pins slide along at least a portion of a length of a lateral section of the L-shaped groove enabling a separation of the base of at least the first package support and the base of the second package support causing the enlarging of the package release aperture. Additionally or alternatively, some embodiments in inducing the release plate to move cause a first locking groove of the set of at least one locking grooves to slide in a first direction along a lateral section of a first groove pin of the set of at least one groove pins with the first groove pin secured with the first package support. A second locking groove of the set of at least one locking grooves can be caused to slide in a second direction along a lateral section of a second groove pin of the set of at least one groove pins with the second groove pin is secured with the second package support.

Some embodiments direct that a package 500 to be delivered is to be positioned into a package receiving aperture 306 of the package support frame 102 such that a first side of the package induces a lateral force 512 on a first tapered side 124 of a first package support 104 when the package is supported by the package support frame and a second side of the package induces a lateral force 512 on a second tapered side 124 of a second package support when the package is supported by the package support frame. In some implementations, the first tapered side 124 is tapered from a top to a bottom toward the second package support and the second tapered side 124 is tapered from a top to a bottom toward the first package support resulting in a reduced area at the base 118 of the support frames than at a package receiving aperture 306 (e.g., at a top of the package supports). In enabling the base of the first package support to pivot away from the base of the second package support, some embodiments utilize the induced lateral force on the first tapered side 124 and on the second tapered side 124 to aid in causing the set of groove pins to slide along respective locking grooves and/or the set of at least one locking groove to slide along the respective one of the set of at least one of the groove pins to aid in causing at least the first package support to pivot away from the base of the second package support to enlarge the package release aperture 304.

Movement of the package 500 beyond a threshold toward the package release aperture when the release plate 108 is in a locked position can be inhibited based on contact between the first side or wall of the package contacting the first tapered side of the first package support and the second side or wall of the package contacting the second tapered side of the second package support. In some embodiments, the package support frame and the package to be delivered while positioned within the package support frame are suspended by one or more suspension supports 126 coupled with each of the first and second package supports 104. Some embodiments utilize a UAV 702 to transport the package support frame 102 and the package 500 positioned within the package support frame to the delivery location. In causing the package support frame to be lowered, some embodiments cause the UAV to lower the package support frame and package from a height (e.g., reducing an altitude of the UAV, activating a crane system, etc.).

Figure 16:
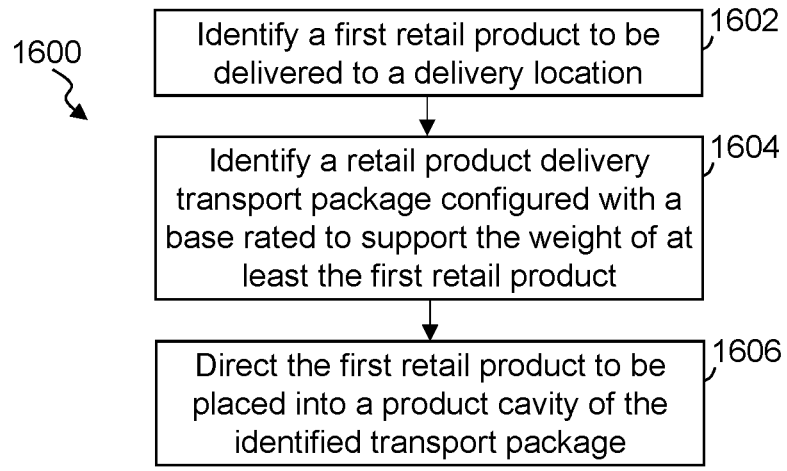
FIG. 16 illustrates a simplified flow diagram of an exemplary process of delivering a retail product to a customer, in accordance with some embodiments.

FIG. 16 illustrates a simplified flow diagram of an exemplary process 1600 of delivering a retail product to a customer, in accordance with some embodiments. In step 1602, a first retail product is identified that is to be delivered to a delivery location associated with a first customer. In step 1604, a retail product delivery transport package is identified that is configured with a base rated to support the weight of at least the first retail product while the transport package is suspended without support under the base. In some embodiments, a central delivery control system identifies the one or more products to be delivered to the delivery location and determines one or more total weights of one or more sets of at least one of those products. The one or more weights can be evaluated relative to one or more weight thresholds. In some instances, the weight thresholds are defined based on transport package weight thresholds that should not be exceeded for a respective one of multiple different transport packages having different weight thresholds. One of the different transport packages can be selected at least in part based on the weight of the one or more products intended to be placed within the transport package.

In step 1606, one or more of the retail products can be directed to be placed into a product cavity 1222 of the identified transport package. In some embodiments, the transport package includes a base 802, and a first set of at least two lateral tapered walls 514-515. At least two of the tapered walls extend at an angle from the base 802 and to a height from the base of an opening level 1202 defining part of an opening 1204 of the package. In some implementations, a first tapered wall and a second tapered wall of the first set of tapered walls are separated by a length of the base and extend from the base at the angle such that a distance between the first tapered wall and the second tapered wall at the opening 1204 is greater than a distance between the first tapered wall and the second tapered wall at the base 802. The first tapered wall and the second tapered wall may further be configured to frictionally engage tapered sides 124 of one or more package supports 104 of a product delivery package carrier system 101 to prevent the transport package 500 from extending beyond a threshold depth 508 into a package cavity 302 of the package carrier system. Further, in some implementations the transport package includes a second set of at least one wall comprising at least a first vertical wall 1002 that extends from the base 802 and is substantially perpendicular to the base along a height of the first vertical wall.

Some embodiments direct the transport package, containing at least the first retail product, to be positioned into a first package carrier system 101 to cause the first tapered wall 514 and the second tapered wall 515 to frictionally engage first and second tapered sides 124 of the first and second package supports 104, respectively, of a package carrier system 101 to prevent the transport package 500 from extending beyond the threshold depth into a package cavity 304 of the package carrier system. Further, some embodiments direct the closing of the transport package including directing the folding of a first lid flap of the first vertical wall at the opening level to extend over a portion of the opening, and a folding of a handle tab into a tab aperture formed in a second lid flap of a third tapered wall extending from the base along the height and positioned extending between the first tapered wall and the second tapered wall defining a length of the transport package, with the second lid flap configured to fold at the opening level and extend over a portion of the opening. The direction can further comprise directing the first lid flap to be folded through a tab aperture to extend back toward the fold of the first vertical wall and along a portion of a width of the first lid flap, and defining a handle. One or more programmable RFID tags can be programmed with, for example, product identifying information that identifies at least one product placed within a product cavity 1222 that is defined in part by the first tapered wall, the second tapered wall and the first vertical wall.

Additionally, some embodiments may identify that a first mode of delivery is unavailable, and direct the transport package to be positioned within a package cavity of a transport bin 1402 with the first vertical wall 1002 abutted against a different vertical wall of a different transport package and establishing a cooperative exterior shape of the two transport packages that is an inverse of the package cavity of the separate transport bin. Some embodiments direct an affixing system 1404 secured with an exterior of the first vertical wall to mate with a different affixing system 1404 secured on the different vertical wall of the different transport package.

In some embodiments, some or all of the processes described above and below (e.g., process 1500 and process 1600) may be implemented by a central delivery control system. The central delivery control system may be communicatively coupled with a delivery vehicle coordination system, a product inventory system or other such systems. The product inventory system can be configured to track inventory quantities of products available for delivery and/or locations within a storage facility of the available products. Further, some or all of the processes may be implemented through a UAV control circuit, a delivery vehicle, the delivery vehicle coordination system, and/or other such systems. The delivery vehicle coordination system tracks the location, use and status of delivery trucks, delivery vans, UAVs, UGVs and/or other such delivery vehicles.

Figure 17:
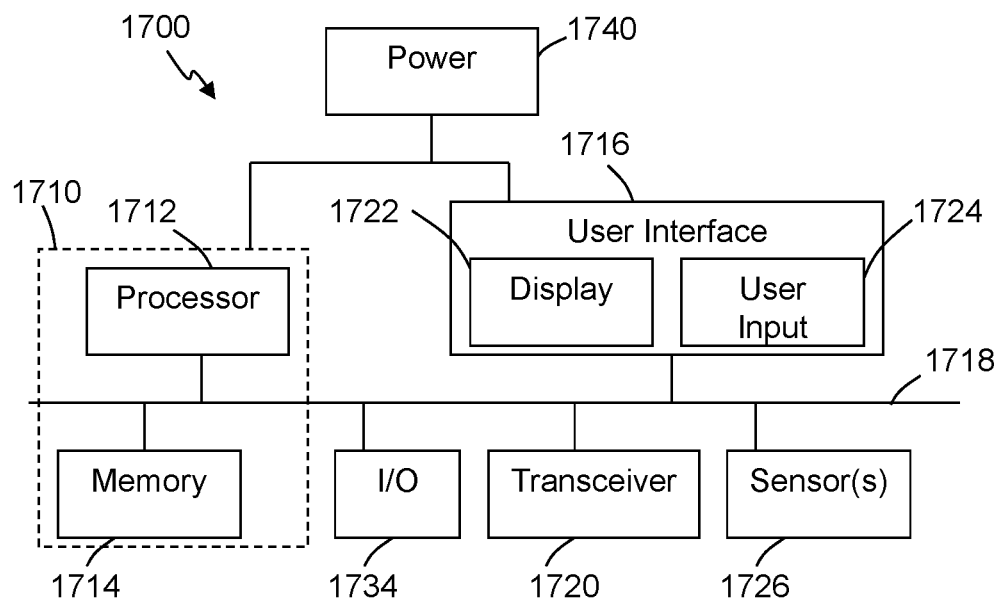
FIG. 17 illustrates an exemplary system for use in implementing methods, techniques, systems, devices, apparatuses, servers, sources and delivering retail products to customers, in accordance with some embodiments.

Further, the systems, circuits, circuitry, controllers, processes, methods, techniques, functionality, servers and the like described herein may be utilized, implemented and/or run on many different types of devices and/or systems. FIG. 17 illustrates an exemplary system 1700 that may be used for implementing any of the systems, components, controllers, circuits, circuitry, functionality, apparatuses, processes, devices, and/or other above or below mentioned systems or devices, or parts of such circuits, circuitry, functionality, systems, apparatuses, processes, or devices. For example, the system 1700 may be used to implement some or all of the UAV control circuit, central delivery control system, delivery vehicle, crane system, and/or other such systems, components, circuitry, functionality and/or devices. However, the use of the system 1700 or any portion thereof is certainly not required.

By way of example, the system 1700 may comprise a control circuit or processor module 1712, memory 1714, and one or more communication links, paths, buses or the like 1718. Some embodiments may include one or more user interfaces 1716, and/or one or more internal and/or external power sources or supplies 1740. The control circuit 1712 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 1712 can be part of control circuitry and/or a control system 1710, which may be implemented through one or more processors with access to one or more memory 1714 that can store instructions, code and the like that is implemented by the control circuit and/or processors to implement intended functionality. In some applications, the control circuit and/or memory may be distributed over a communications network (e.g., LAN, WAN, Internet) providing distributed and/or redundant processing and functionality. Again, the system 1700 may be used to implement one or more of the above or below, or parts of, components, circuits, systems, processes and the like. For example, the system may implement a UAV control circuit with the control circuit being a UAV control circuit, a central delivery control system with the control circuit being a delivery control circuit, or other components.

The user interface 1716 can allow a user to interact with the system 1700 and receive information through the system. In some instances, the user interface 1716 includes a display 1722 and/or one or more user inputs 1724, such as buttons, touch screen, track ball, keyboard, mouse, etc., which can be part of or wired or wirelessly coupled with the system 1700. Typically, the system 1700 further includes one or more communication interfaces, ports, transceivers 1720 and the like allowing the system 1700 to communicate over a communication bus, a distributed computer and/or communication network (e.g., a local area network (LAN), the Internet, wide area network (WAN), etc.), communication link 1718, other networks or communication channels with other devices and/or other such communications or a combination of two or more of such communication methods. Further the transceiver 1720 can be configured for wired, wireless, optical, fiber optical cable, satellite, or other such communication configurations or combinations of two or more of such communications. Some embodiments include one or more input/output (I/O) ports 1734 that allow one or more devices to couple with the system 1700. The I/O ports can be substantially any relevant port or combinations of ports, such as but not limited to USB, Ethernet, or other such ports. The I/O interface 1734 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

The system 1700 comprises an example of a control and/or processor-based system with the control circuit 1712. Again, the control circuit 1712 can be implemented through one or more processors, controllers, central processing units, logic, software and the like. Further, in some implementations the control circuit 1712 may provide multiprocessor functionality.

The memory 1714, which can be accessed by the control circuit 1712, typically includes one or more processor readable and/or computer readable media accessed by at least the control circuit 1712, and can include volatile and/or non-volatile media, such as RAM, ROM, EEPROM, flash memory and/or other memory technology. Further, the memory 1714 is shown as internal to the control system 1710; however, the memory 1714 can be internal, external or a combination of internal and external memory. Similarly, some or all of the memory 1714 can be internal, external or a combination of internal and external memory of the control circuit 1712. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over the computer network. The memory 1714 can store code, software, executables, scripts, data, content, lists, programming, programs, log or history data, user information, customer information, product information, and the like. While FIG. 17 illustrates the various components being coupled together via a bus, it is understood that the various components may actually be coupled to the control circuit and/or one or more other components directly.

Some embodiments provide a package release system that includes a simple release triggered by the release tab pressing against a surface (e.g., due to weight of the package support frame 102 and/or package 500). In response, the release plate is activated and at least the bottoms of one or both package supports open to allow the package to be carefully set on the surface. Once the package is released, the "load" is reduced. This reduced load can, in some implementations, simplify the removal of the package carrier system 101 from the delivery site (e.g., reduced load allows a UAV to more easily fly off while carrying the package carrier system. The opening of the package supports 104 allows the package to drop out of the package carrier system to touch down gently on the surface and remain upright without damaging the item in the package. This delivery mechanism is significantly different that other types of "drop" systems that drop the package from a height that may damage fragile items and/or result in the package being in a non-desired orientation. Further, such previous systems typically employ an electromechanical system where a control circuit transmits an activation signal to activate a release of the package, which adds complexity and cost to the delivery mechanism.

The package carrier system 101 can, in some embodiments, be implemented through a strictly mechanical design that does not use electricity to activate the release of the package, and no manual or system trigger. The package carrier system releases the package gently in response to the movement of the release plate by the contact of the release tab with the delivery surface and the weight of the package and package support frame. The package carrier system can be constructed in an aerodynamic configuration, and/or to fit closely with a UAV (e.g., allow one or more of multiple propellers to be close together without interfering with the propeller exhaust). Some embodiments enhance the release and/or movement of the package supports through spring biasing, which may allow for a more durable configuration. In some embodiments, a UAV may return to a launch site or other location to have another package placed within the package carrier system or to drop the package carrier system, and be coupled with another package carrier system and package ready for delivery. Some embodiments enable the package carrier system to cooperate with machinery to automate the loading of packages within package carrier systems.

Building a load for a UAV becomes difficult due to the various scenarios that might make delivery by UAV not possible. For example, threshold levels of rainfall, sleet, snow, winds in excess of a threshold, threshold temperatures and the like might limit or prevent some methods of delivery, such as instances where UAV flights are cancelled. The package carrier system and/or transport package 500 allow for alternative methods of delivery to be in place and ready for implementation so that deliveries can occur and get products delivered to customers. Having a seamless alternative for delivery is imperative. The transport package 500 design allows the delivery method to be readily changed without having to re-pack the merchandise. This package design is configured to fit within the package carrier system as well as be easily placed in existing totes, placed in a backpack, packed onto a scooter, and the like. Today, most box shapes are square or rectangle, and are built for simple stacking. The transport package 500 provides additional functionality allowing it to enhance part of the functionality of the release of the package carrier system 101 as well as providing conversion capability to various transport methods with minimal effort. The transport package can include the handle 806 that allows the package to be easily picked up, removed from a tote, and the like. In some instances, the package can include a seal and/or interior back that can be substantially air tight. In some embodiments, an exterior surface is partially or fully reflective to minimize heat absorption.

In some embodiments, systems include a retail product delivery system comprising: a package support frame comprising a first package support, a second package support, and at least one pivot coupler pivotably securing the first package support with the second package support and enabling a base of the first package support to pivot away from a base of the second package support; and a first release plate positioned across a separation between the first package support and the second package support, and comprising: a set of at least one angled locking grooves; a set of at least one groove pins each secured with one of the first package support and the second package support and slidably positioned within a respective one of the set of at least one locking grooves; and a first release tab extending beyond the base of the first package support and the base of the second package support; wherein the first release tab is configured to contact a surface and cause an unlocking of the first release plate such that the first release plate moves with the set of at least one locking grooves sliding along the respective one of the set of at least one of the groove pins such that the base of the first package support pivots away from the base of the second package support enlarging a package release aperture.

Further, some embodiments provide methods of delivering a package at a delivery location, comprising: causing a package support frame supporting a package to be lowered toward a delivery surface; causing a first release tab cooperated with the package support frame to contact the delivery surface; inducing a first release plate, comprising the first release tab and positioned across a separation between a first package support and a second package support of the package support frame, to move causing a set of at least one angled locking grooves of the first release plate to slide along a respective one of a set of at least one groove pins each secured with one of the first package support and the second package support; and enabling, based on the set of at least one locking grooves sliding along the respective one of the set of at least one groove pins, a base of the first package support to pivot away from a base of the second package support, enlarging the package release aperture, and enabling the package to drop through the enlarged package release aperture.

Some embodiments provide retail product delivery transport packages comprising: a base; a first set of tapered walls comprising at least two walls, wherein each of the at least two walls extend at an angle from the base and to a height from the base of an opening level defining part of an opening, wherein a first tapered wall and a second tapered wall of the first set of tapered walls are separated by a length of the base and extend from the base at the angle such that a distance between the first tapered wall and the second tapered wall at the opening is greater than a distance between the first tapered wall and the second tapered wall at the base, and wherein the first tapered wall and the second tapered wall are configured to frictionally engage first and second tapered package support walls, respectively, of a retail product delivery package carrier system to prevent the transport package from extending beyond a threshold depth into a package cavity of the package carrier system; and a second set of at least one wall comprising at least a first vertical wall that extends from the base and is substantially perpendicular to the base along a height of the first vertical wall.

Still further embodiments provide methods of delivering a retail product to a customer, comprising: identifying a first retail product to be delivered to a delivery location associated with a first customer; identifying a retail product delivery transport package configured with a base rated to support the weight of at least the first retail product while the transport package is suspended without support under the base; and directing the first retail product to be placed into a product cavity of the identified transport package comprising the base; a first set of tapered walls comprising at least two tapered walls, wherein each of the at least two tapered walls extend at an angle from the base and to a height from the base of an opening level defining part of an opening, wherein a first tapered wall and a second tapered wall of the first set of tapered walls are separated by a length of the base and extend from the base at the angle such that a distance between the first tapered wall and the second tapered wall at the opening is greater than a distance between the first tapered wall and the second tapered wall at the base, and wherein the first tapered wall and the second tapered wall are configured to frictionally engage tapered sides of one or more package supports of a product delivery package carrier system to prevent the transport package from extending beyond a threshold depth into a package cavity of the package carrier system; and a second set of at least one wall comprising at least a first vertical wall that extends from the base and is substantially perpendicular to the base along a height of the first vertical wall.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A retail product delivery transport package, comprising:
   a base;
   a first set of tapered walls comprising at least two side walls, wherein each of the at least two walls extend at an angle from the base and to a height from the base of an opening level defining part of an opening, wherein a first tapered wall and a second tapered wall of the first set of tapered walls are separated by a length of the base and extend from the base at the angle such that a distance between the first tapered wall and the second tapered wall at the opening is greater than a distance between the first tapered wall and the second tapered wall at the base, and wherein the first tapered wall and the second tapered wall are configured to frictionally engage first and second tapered package support walls, respectively, of a retail product delivery package carrier system to prevent the transport package from extending beyond a threshold depth into a package cavity of the package carrier system;
   a second set of at least one wall comprising at least a first vertical wall that extends from the base and is substantially perpendicular to the base along a height of the first vertical wall;
   a third tapered wall extending from the base along the height and positioned extending between the first tapered wall and the second tapered wall defining a length of the transport package;
   a first lid flap extending from the first vertical wall at a fold of the first vertical wall at the opening level, wherein the first lid flap is configured to extend over at least a first portion of the opening; and
   a second lid flap extending from a fold of the third tapered wall at the opening level, wherein the second lid flap is configured to extend over at least a second portion of the opening;
   wherein the first vertical wall is configured to abut against a different vertical wall of a different transport package, wherein the first vertical wall comprises an affixing system secured with an exterior of the first vertical wall between the base and the fold of the first vertical wall and configured to mate with a different affixing system secured with the different vertical wall of the different transport package temporarily securing the first vertical wall with the different vertical wall of the different transport package such that the first vertical wall abuts against the different vertical wall with the cooperation between the transport package and the different transport package positioning the third tapered wall of the transport package separated from a different third tapered wall of the different transport package by widths of both the transport package and the different transport package having a total width of the cooperation between the transport package and the different transport package at the base less than a total width at the opening level.

2. The transport package of claim 1, further comprising: wherein the first lid flap comprises a handle tab; and
   wherein the second lid flap comprises a tab aperture configured to align with and receive at least a portion of the handle tab with at least the portion of the handle tab being configured to fold through the tab aperture to extend back toward the fold of the first vertical wall and along a portion of a width of the first lid flap, and defining a handle.

3. The transport package of claim 1, wherein the base and at least the first tapered wall and the second tapered wall are a single continuous piece.

4. The transport package of claim 1, wherein the first tapered wall and the second tapered wall are separated by a distance to frictionally engage the first and second package support walls of the package carrier system, respectively, such that the first tapered wall is configured to induce a force on the first package support wall in a direction away from the second package support wall, and the second tapered wall is configured to induce a force on the second package support wall in a direction away from the first package support wall.

5. The transport package of claim 4, further comprising:
   a programmable RFID tag configured to receive product identifying information of at least one product placed within a product cavity defined in part by the first tapered wall, the second tapered wall and the first vertical wall.

6. The transport package of claim 4, further comprising:
   a package RFID tag storing a transport package identifier unique to the transport package.

7. The transport package of claim 1, wherein the first vertical wall is configured to abut against the different vertical wall of the different transport package and establish a cooperative exterior shape that is an inverse of a package cavity of a separate transport bin and configured to fit within the package cavity of the transport bin.

8. The transport package of claim 1, wherein each of the first tapered wall, the second tapered wall and the first vertical wall comprises insulation configured to reduce rate of change of temperature within a product cavity defined in part by the first tapered wall, the second tapered wall and the first vertical wall.

9. The transport package of claim 1, wherein the affixing system comprises an affixing tab fixed with the first vertical wall wherein the affixing tab is configured to temporarily mate with an affixing aperture of the affixing system of the different vertical wall of the different transport package.

10. The transport package of claim 9, wherein the first lid flap comprises a first tab, and the second lid flap comprises a first aperture that temporarily mates with the first tab when the first lid flap is folded to cover the first portion of the opening and the second lid flap is folded to cover the second portion of the opening.

11. The transport package of claim 1, wherein the affixing system comprises an affixing tab and an affixing aperture fixed with the first vertical wall.

12. The transport package of claim 1, further comprising:
wherein the first lid flap comprising a handle tab; and
wherein the second lid flap comprising a first tab aperture separated from an edge of the second lid flap by a distance defining a handle support formed in the second lid flap, wherein the first tab aperture aligns with and receives a portion of the handle tab;
a third lid flap extending from a fold of the first tapered wall at the opening level, wherein the third lid flap extends over a third portion of the opening and comprises a second tab aperture that aligns with and receives the portion of the handle tab when extended over the third portion of the opening; and
a fourth lid flap extending from a fold of the second tapered wall at the opening level, wherein the fourth lid flap extends over a fourth portion of the opening and comprises a third tab aperture that aligns with and receives the portion of the handle tab when extended over the fourth portion of the opening.

13. The transport package of claim 12, further comprising an optically scannable package identifier fixed to an exterior of at least one of the base, the first tapered wall, the second tapered wall, and the first vertical wall; and at least one package radio frequency identifier (RFID) tag secured with at least one of the base, the first tapered wall, the second tapered wall, and the first vertical wall.

14. The transport package of claim 12 wherein the affixing system comprises hook-and-loop fastener structure fixed with the first vertical wall and configured to temporarily cooperate with a different hook-and-loop fastener structure fixed to the different vertical wall of the different transport package.

15. The transport package of claim 12, wherein the affixing system comprises an affixing tab fixed with the first vertical wall wherein the affixing tab is configured to temporarily mate with an affixing aperture of the affixing system of the different vertical wall of the different transport package.

* * * * *